US012595056B2

(12) United States Patent
Parraga et al.

(10) Patent No.: US 12,595,056 B2
(45) Date of Patent: Apr. 7, 2026

(54) WINCH ASSEMBLIES FOR UNMANNED AERIAL VEHICLE DELIVERY SYSTEMS

(71) Applicant: AERO VELOCITY INC., Sharonville, OH (US)

(72) Inventors: Rich Parraga, Loveland, OH (US); James Wagner, Loveland, OH (US); Phil McDermott, Loveland, OH (US); Gianfranco Trovato, Loveland, OH (US); Joseph Sams, Loveland, OH (US); Mark Beaulieu, Loveland, OH (US); Wei Wei, Loveland, OH (US)

(73) Assignee: AERO VELOCITY INC., Sharonville, OH (US)

( * ) Notice: Subject to any disclaimer, the term of this patent is extended or adjusted under 35 U.S.C. 154(b) by 605 days.

(21) Appl. No.: 17/725,990

(22) Filed: Apr. 21, 2022

(65) Prior Publication Data
US 2023/0331384 A1 Oct. 19, 2023

Related U.S. Application Data

(60) Provisional application No. 63/330,997, filed on Apr. 14, 2022.

(51) Int. Cl.
B64D 1/22 (2006.01)
B64D 1/08 (2006.01)
(Continued)

(52) U.S. Cl.
CPC ................. B64D 1/22 (2013.01); B64D 1/08 (2013.01); B66D 1/12 (2013.01); B66D 1/48 (2013.01);
(Continued)

(58) Field of Classification Search
CPC ............................. B64D 1/22; B64U 2101/67
See application file for complete search history.

(56) References Cited

U.S. PATENT DOCUMENTS 6,431,103 B1 8/2002 Meyerdierks
9,302,770 B2 4/2016 Burgess et al.
(Continued)

FOREIGN PATENT DOCUMENTS

CA 3125408 A1 10/2021
CN 206654621 U 11/2017
(Continued)

OTHER PUBLICATIONS

International Search Report; International Searching Authority; International Application No. PCT/US23/18498; Aug. 23, 2023; 5 pages.
(Continued)

*Primary Examiner* — Jessica B Wong
(74) *Attorney, Agent, or Firm* — Taft Stettinius & Hollister LLP

(57) ABSTRACT

Certain embodiments of the present application relate to an unmanned aerial vehicle, comprising a chassis, a control system mounted to the chassis, at least one rotor operable to generate lift under control of the control system, a spool having a wound portion of a line wound thereon, the line including a free portion, an attachment device secured to the free portion of the line and configured to facilitate attachment of a parcel to the line, a motor operable to rotate the spool under control of the control system such that the control system is operable to raise the attachment device to a raised position and lower the attachment device from the raised position, and a spring positioned between the chassis and the attachment device such that the spring is engaged (Continued)

between the chassis and the attachment device when the attachment device is in the raised position.

17 Claims, 13 Drawing Sheets

(51) Int. Cl.

| | |
|---|---|
| *B66D 1/12* | (2006.01) |
| *B66D 1/48* | (2006.01) |
| *B66D 1/60* | (2006.01) |
| *B66D 5/34* | (2006.01) |
| *B64U 10/13* | (2023.01) |
| *B64U 30/20* | (2023.01) |
| *B64U 101/60* | (2023.01) |

(52) U.S. Cl.
CPC .............. *B66D 1/485* (2013.01); *B66D 1/60* (2013.01); *B66D 5/34* (2013.01); *B64U 10/13* (2023.01); *B64U 30/20* (2023.01); *B64U 2101/60* (2023.01)

(56) References Cited

U.S. PATENT DOCUMENTS

| | | | |
|---|---|---|---|
| 9,567,196 | B2 | 2/2017 | Horndacher et al. |
| 9,676,481 | B1 | 6/2017 | Buchmueller |
| 9,957,046 | B2 | 5/2018 | Patrick et al. |
| 10,000,285 | B2 | 6/2018 | Shannon et al. |
| 10,071,804 | B1 | 9/2018 | Buchmueller et al. |
| 11,884,397 | B2 * | 1/2024 | Parraga .................... B64D 1/22 |
| 2013/0233964 | A1 | 9/2013 | Woodworth et al. |
| 2017/0240293 | A1 | 8/2017 | Repp et al. |
| 2017/0253334 | A1 | 9/2017 | Takayama et al. |
| 2019/0002101 | A1 | 1/2019 | Penet et al. |
| 2019/0100314 | A1 | 4/2019 | Prager et al. |
| 2019/0263523 | A1 | 8/2019 | High et al. |
| 2019/0359332 | A1 * | 11/2019 | Shannon ................. B66F 19/00 |
| 2020/0094962 | A1 | 3/2020 | Sweeny et al. |
| 2020/0140245 | A1 | 5/2020 | Yasuda |
| 2020/0207471 | A1 | 7/2020 | Yasuda |
| 2021/0221508 | A1 | 7/2021 | Yamato |
| 2023/0331383 | A1 * | 10/2023 | Parraga .................... B64D 1/22 |
| 2023/0331386 | A1 * | 10/2023 | Parraga .................... B66D 1/60 |

FOREIGN PATENT DOCUMENTS

| | | | |
|---|---|---|---|
| CN | 212509286 | U | 6/2020 |
| CN | 112067365 | A | 12/2020 |
| CN | 113212764 | A | 8/2021 |
| EP | 3882143 | A1 | 9/2021 |
| GB | 723045 | A | 2/1955 |

OTHER PUBLICATIONS

Written Opinion of the International Searching Authority; International Searching Authority; International Application No. PCT/US23/18498; Aug. 23, 2023; 15 pages.

* cited by examiner

WINCH ASSEMBLIES FOR UNMANNED AERIAL VEHICLE DELIVERY SYSTEMS

CROSS-REFERENCE TO RELATED APPLICATIONS

The present application claims the benefit of U.S. Provisional Patent Application No. 63/330,997, filed Apr. 14, 2022, the contents of which are incorporated by reference in their entirety.

TECHNICAL FIELD

The present disclosure generally relates to unmanned aerial vehicles, and more particularly but not exclusively relates to systems and methods for facilitating the delivery of a parcel via an unmanned aerial vehicle.

BACKGROUND

In certain circumstances, unmanned aerial vehicles (UAVs) may be utilized to deliver a parcel to a designated location. Some such UAVs include a winch mechanism operable to raise and lower a line to which the parcel is attached for controlled delivery of the parcel while the UAV remains in flight. However, some such winch mechanisms have certain drawbacks and limitations. For example, certain conventional winch mechanisms require that the motor be constantly powered while the parcel is being carried in order to prevent the line from unwinding from the spool. For these reasons among others, there remains a need for further improvements in this technological field.

SUMMARY

Certain embodiments of the present application relate to an unmanned aerial vehicle, comprising a chassis, a control system mounted to the chassis, at least one rotor operable to generate lift under control of the control system, a spool having a wound portion of a line wound thereon, the line including a free portion, an attachment device secured to the free portion of the line and configured to facilitate attachment of a parcel to the line, a motor operable to rotate the spool under control of the control system such that the control system is operable to raise the attachment device to a raised position and lower the attachment device from the raised position, and a spring positioned between the chassis and the attachment device such that the spring is engaged between the chassis and the attachment device when the attachment device is in the raised position. Further forms, features, and embodiments of the present application will become apparent from the description and figures presented herewith.

DETAILED DESCRIPTION OF ILLUSTRATIVE EMBODIMENTS

Figure 1:
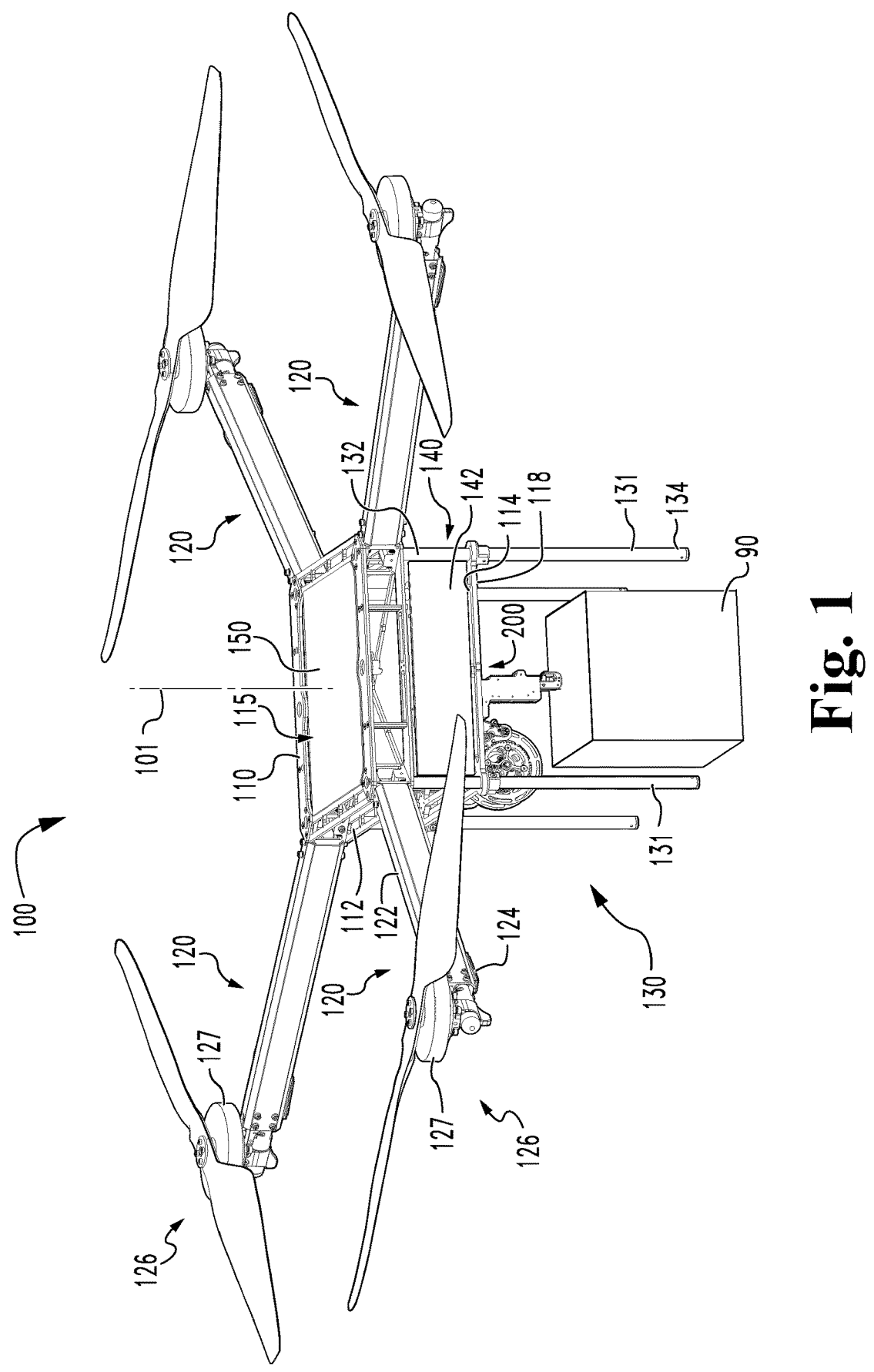
FIG. 1 is a perspective view of an unmanned aerial vehicle (UAV) according to certain embodiments having a parcel loaded to a winch assembly.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

With reference to FIG. 1, illustrated therein is a drone or unmanned aerial vehicle (UAV) 100 according to certain embodiments. The UAV 100 has a central axis 101, and generally includes a chassis 110, a plurality of arms 120 extending outward from the chassis 110, and a landing apparatus 130 extending downward from the chassis 110. As described herein, the chassis 110 has mounted therein a control system 150 and an onboard power supply 140 operable to provide electrical power to the control system 150 and other electronic components of the UAV 100. As also described herein, the illustrated UAV 100 further includes a winch assembly 200 according to certain embodiments, which may be utilized to facilitate delivery of a parcel 90 by the UAV 100.

The chassis 110 defines a main body of the UAV 100, to which various other components of the UAV 100 are attached. The chassis 110 includes an outer frame 112 to which the arms 120 and landing apparatus 130 are attached, a first receiving space 114 in which the power supply 140 is seated, and a second receiving space 115 in which the control system 150 is seated. The first receiving space 114 is defined in part by a mounting plate 118 to which the winch assembly 200 is attached as described herein. While the illustrated chassis 110 generally has the geometry of a parallelepiped with a square cross-section relative to the central axis 101, it is also contemplated that the chassis 110 may have another cross-sectional geometry.

Each arm 120 has an inner end portion 122 connected to the frame 112 of the chassis 110, and an opposite outer end portion 124 to which is mounted a rotor 126. Each rotor 126 includes a motor 127 that is in communication with the control system 150 such that the control system 150 is operable to control the rotors 126 using power drawn from the power supply 140. More particularly, the control system 150 is configured to control operation of the rotors 126 to provide lift and motion control for the UAV 100.

The landing apparatus 130 includes a plurality of legs 131, each of which has an upper end portion 132 connected to the chassis frame 112 and an opposite lower end portion or foot 134. In certain embodiments, the landing apparatus 130 may be connected with the power supply 140 such that the power supply 140 is operable to be charged via the legs 131.

The power supply 140 is operable to provide power to the control system 150 and/or other electronic components of the UAV 100, and in the illustrated form includes at least one battery 142. In certain embodiments, the power supply 140 may include plural batteries 142. In certain embodiments, the power supply 140 may include a portable power supply of a type other than batteries, such as super capacitors.

Figure 2:
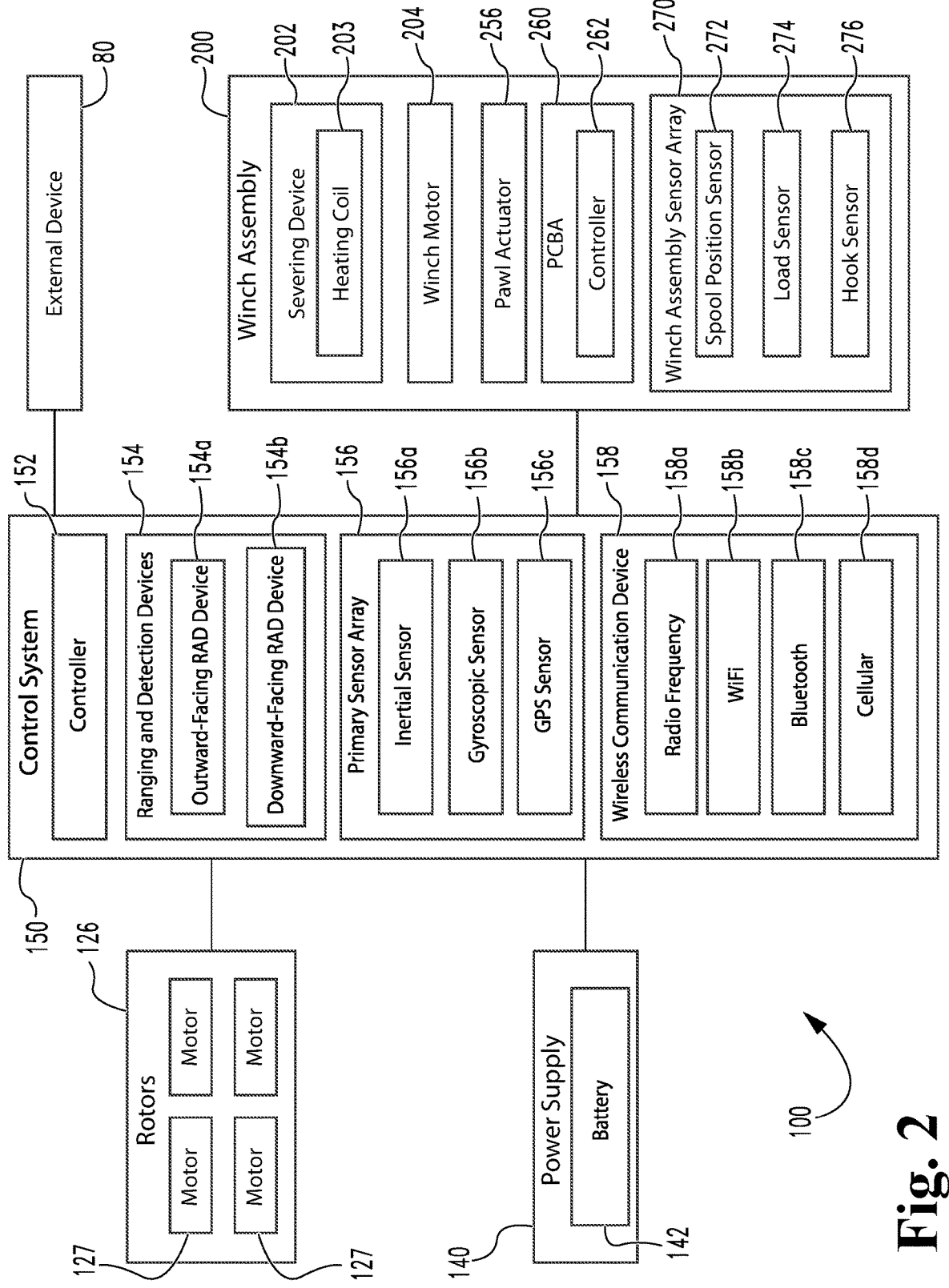
FIG. 2 is a schematic block diagram of the UAV illustrated in FIG. 1.

With additional reference to FIG. 2, the illustrated control system 150 generally includes a controller 152, one or more ranging-and-detection devices 154, and a primary sensor array 156, and may further include one or more wireless communication devices 158. The control system 150 is in communication with the rotors 126 and is connected with the power supply 140 such that the controller 152 is operable to control the motors 127 to generate lift to fly the UAV 100. The control system 150 may be configured to control the rotors 126 to control the flight envelope of the UAV 100. The control system 150 may be configured to provide for protection of the flight envelope by avoiding obstacles, for example using the ranging-and-detection device(s) 154. The control system 150 is also in communication with the winch mechanism 200 such that the control system 150 is operable to receive information from and/or control operation of the winch mechanism 200.

The ranging-and-detection devices 154 may include an outward-facing ranging-and-detection device 154a operable to sense obstacles in the flight path of the UAV 100 and/or a downward-facing ranging-and-detection device 154b operable to sense a distance between the UAV 100 and the ground or another designated surface. As noted above, the outward-facing ranging-and-detection device 154a be utilized to aid in providing flight envelope protection for the UAV 100. The downward-facing ranging-and-detection device 154b may be mounted to the underside of the chassis 110. Each of the ranging-and-detection devices 154 may, for example, be provided as radar-type, optical camera devices, infrared detection devices, or LIDAR-type ranging-and-detection devices. In certain embodiments, optical and infrared detection devices may employ the use of active emitters, such as visible-spectrum searchlights, and non-visible spectrum lights. In certain embodiments, a ranging-and-detection device 154 may utilize binocular stereo vision technology.

The sensors of the primary sensor array 156 may be of any type typical to unmanned aerial vehicles, and the information generated by the sensors may be used to aid in the control of the UAV 100 and/or other vehicles on the ground or in the air. By way of non-limiting example, the primary sensor array 156 may include an inertial sensor 156a, a gyroscopic sensor 156b, and/or a global positioning system (GPS) chip 156c. The inertial sensor 156a may, for example, include a gyroscopic sensor and/or an accelerometer. In certain embodiments, the primary sensor array 156 may include an altitude sensor operable to sense the current altitude of the UAV 100. In certain embodiments, the primary sensor array 156 may include a battery level sensor operable to sense the charge level of one or more batteries 142 of the power supply 140. In certain embodiments, the primary sensor array 156 may include one or more of an Automated Dependent Surveillance Broadcast (ADSB) sensor, legacy 4056 aviation transponder sensors, Terminal Collision and Avoidance System (TCAS) sensors, Enhanced Ground Proximity Warning Device (EGPWS) sensors, and/or laser-gyroscope sensors. Additionally or alternatively, the primary sensor array 156 may include one or more of a magnetometer, a barometer, and/or an airspeed sensor. The primary sensor array 156 may additionally or alternatively include one or more of current sensors, one or more voltage sensors, and/or one or more temperature sensors.

The wireless communication device(s) 158 facilitate communication between the controller 152 and one or more external devices 80. By way of non-limiting example, one or more of the wireless communication device(s) 158 may be provided as a radio frequency (RF) wireless communication device 158a configured to facilitate communication between the control system 150 and the external device 80 via radio frequency electromagnetic radiation. In certain embodiments, an RF wireless communication device 158a may be configured to communicate over the 915 MHz band. Additionally or alternatively, an RF wireless communication device 158a may be configured to communicate over the 2.4 GHz band (e.g., via WiFi). In certain embodiments, the wireless communication device(s) 158 may include a Wi-Fi chip 158b operable to facilitate communication between the control system 150 and the external device 80 via Wi-Fi wireless communication protocols. In certain embodiments, the wireless communication device(s) 158 may include a Bluetooth chip 158c operable to facilitate communication between the control system 150 and the external device 80 via Bluetooth wireless communication protocols. In certain embodiments, the wireless communication device(s) 158 may include a cellular network communication device 158d. It is also contemplated that the wireless communication device(s) 158 may include one or more wireless communication devices of another form.

Figure 3:
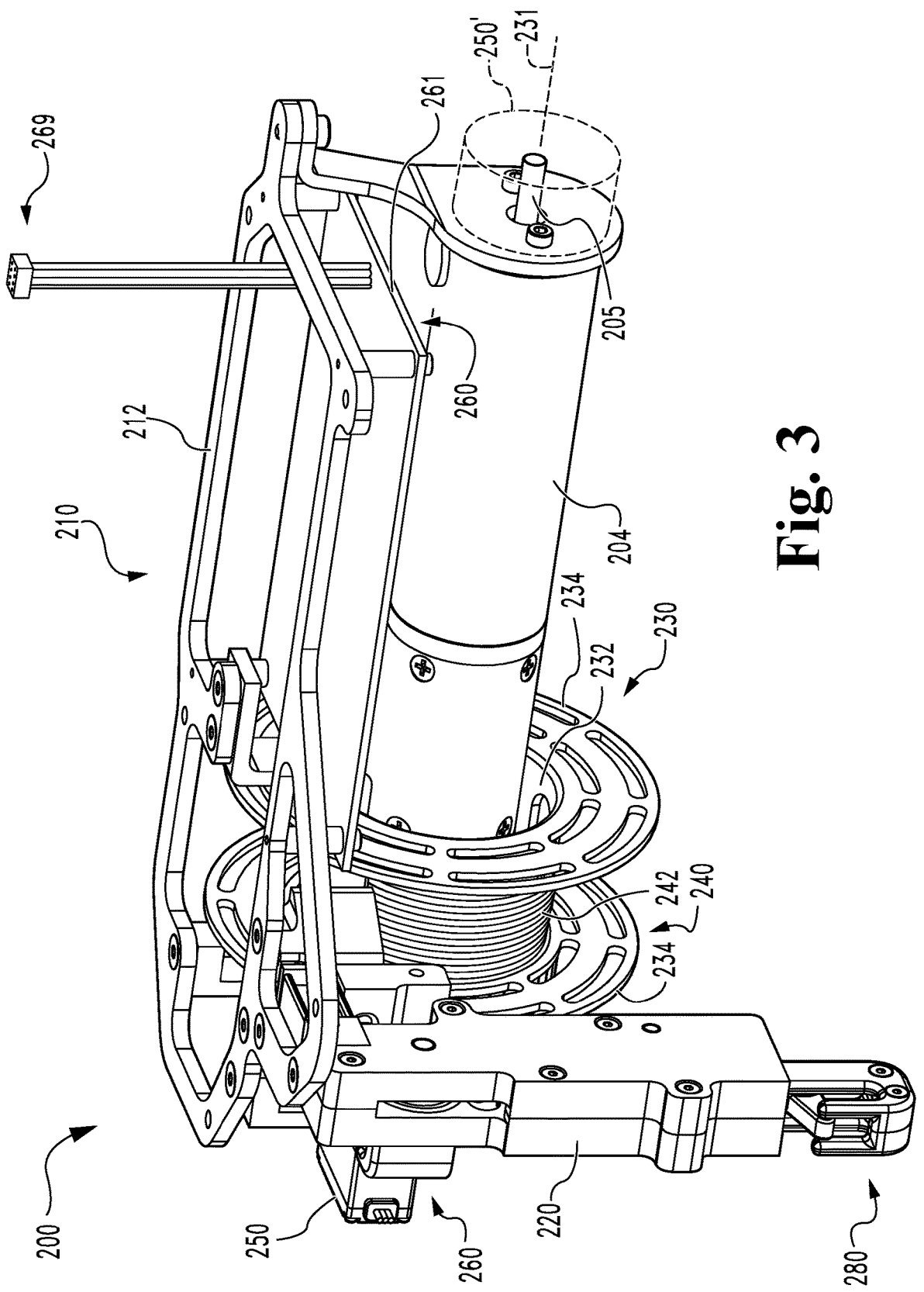
FIG. 3 is a perspective view of a winch assembly according to certain embodiments.
Figure 4:
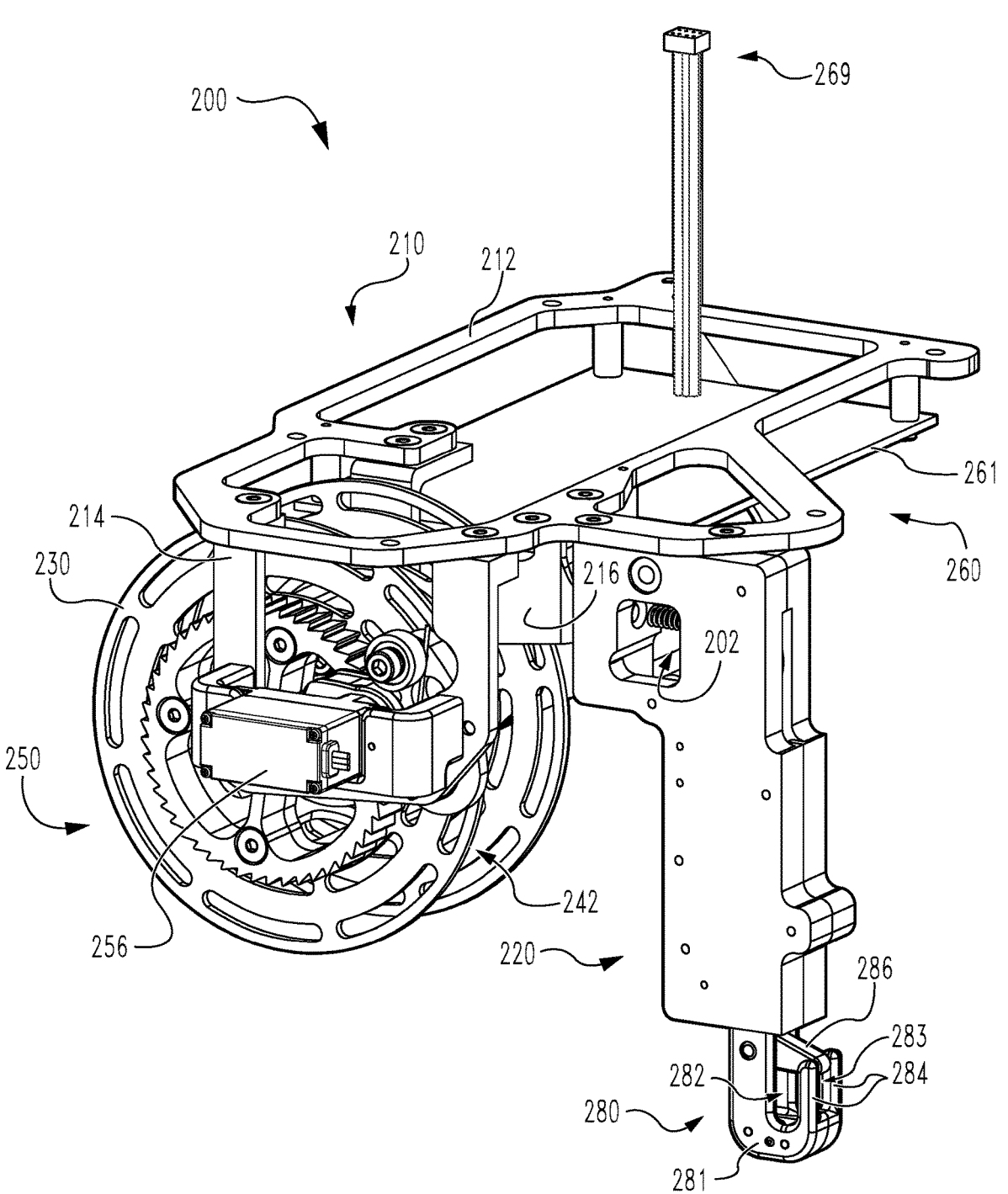
FIG. 4 is an additional perspective view of the winch assembly.
Figure 5:
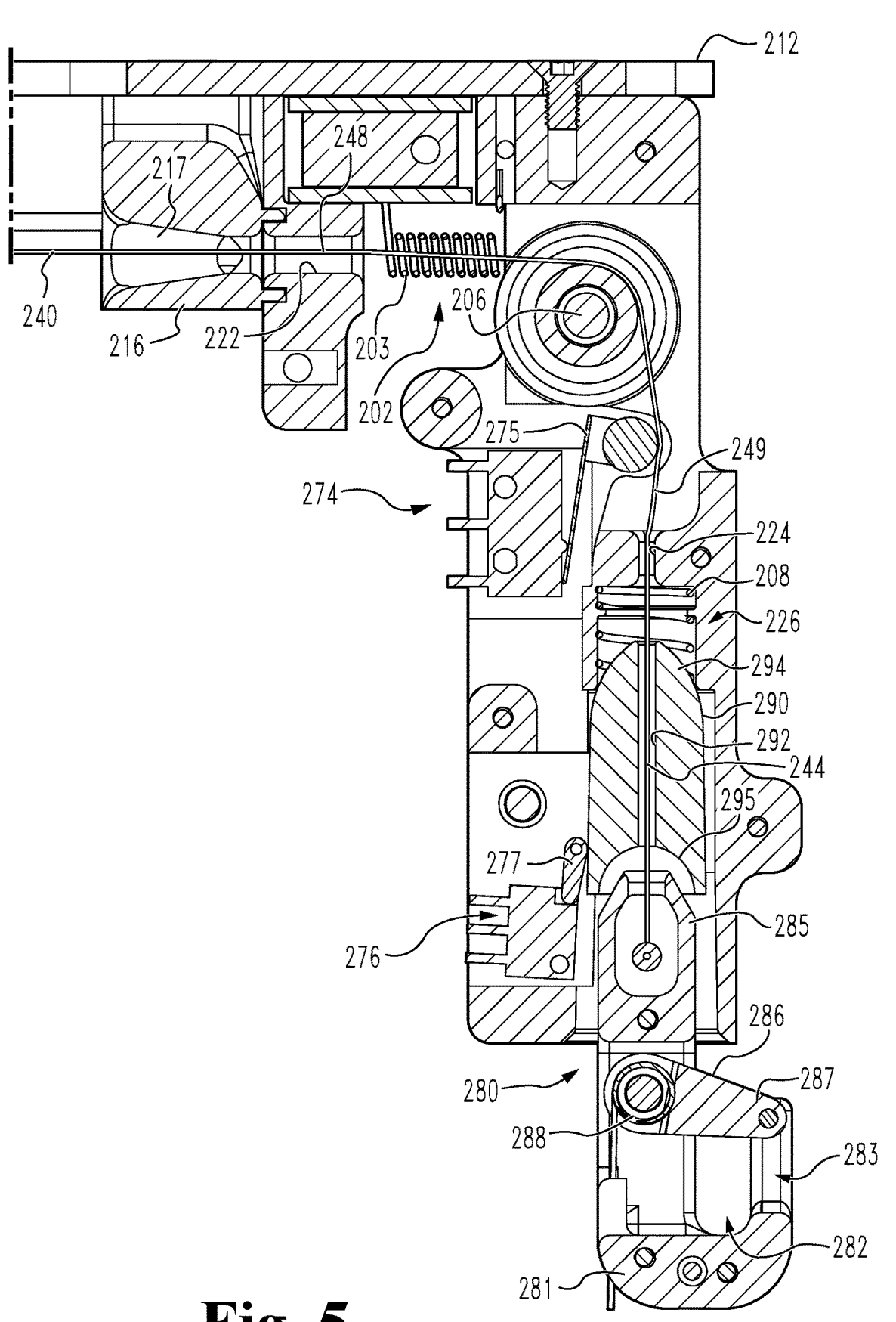
FIG. 5 is a cutaway view of a portion of the winch assembly.

With additional reference to FIG. 3-5, the winch assembly 200 generally includes a mounting assembly 210 including a housing 220, a spool 230 rotatably mounted to the mounting assembly 210, a line 240 having a wound portion 242 that is wound about the spool 230, a motor 204 operable to rotate the spool 230 in at least one direction, and a brake mechanism 250 operable to selectively prevent rotation of the spool 230 in at least one direction. In the illustrated embodiment, the winch assembly 200 further includes a printed circuit board assembly (PCBA) 260, a winch assembly sensor array 270 connected with the PCBA 260, and an attachment device in the form of a gravity hook 280 coupled to a free end 244 of the line 240.

As noted above, the illustrated attachment device is provided in the form of a hook, and more particularly in the form of a gravity hook 280. Example features of the illustrated gravity hook 280 and its attachment to a parcel 90 are described herein. It is also contemplated that the attachment device may not necessarily be in the form of a gravity hook, and may be another form of attachment device that facilitates attachment of a parcel to the line 240. By way of example, other forms of attachment devices may comprise a clamp, an adhesive device, jaws, a clip, or another form of attachment device.

In the illustrated form, the winch assembly 200 further includes a severing mechanism 202 operable to sever the line 240. While other forms are contemplated, the illustrated severing mechanism 202 comprises a heating coil 203 through which a portion of the line 240 extends. Upon receiving an appropriate severing signal (e.g., from the control system 150), the heating coil 203 generates a heat sufficient to burn and/or melt the line 240, thereby severing the line 240. It is also contemplated that the severing mechanism 202 may sever the line 240 in another manner, such as by employing a blade that moves to cut the line 240 upon receiving the severing signal. However, it has been found that the use of a heating coil 203 to melt and/or burn the line may provide certain advantages, such as reducing the number of moving parts and obviating the possibility of an inadvertent severing of the line 240.

The illustrated heating coil 203 is provided in a substantially horizontal orientation, as is the portion of the line 240 that extends through the heating coil 203. This orientation may provide one or more advantages over an arrangement in which the heating coil 203 is vertically-oriented. For example, in embodiments in which the heating coil 203 is vertically-oriented, should the line 240 catch fire, the flame may travel upward along the depending line 240 and scorch or otherwise damage other components of the UAV 100. With the horizontally-oriented heating coil 203, however, the flame is more likely to die out quickly, thereby reducing the risk of damage to other components of the UAV 100.

The mounting assembly 210 generally includes a base plate 212, a mounting bracket 214 depending from the base plate 212 and supporting the spool 230, a guide 216 depending from the base plate 212, and the housing 220, which depends from the base plate 212 and is offset from the mounting bracket 214. When secured to the plate 118, the mounting assembly 210 may be considered to constitute a portion of the chassis 110. The guide 216 includes a funnel-like opening 217 through which the line 240 extends. The opening 217 is generally frustoconical in geometry, has a larger diameter nearer the spool 230, and tapers to a smaller diameter further away from the spool 230. This arrangement may guide the line 240 toward the severing mechanism 202 during unwinding of the line 240 and/or provide for more even distribution of the line 240 about the spool 230 during winding of the line 240.

Various components of the winch assembly 200 are mounted, either directly or indirectly, to the base plate 212 such that the winch assembly 200 can be installed to and removed from the UAV 100 as a modular unit. Such installation of the winch assembly 200 may include securing the base plate 212 to the underside of the mounting plate 118, for example using one or more fasteners such as screws and/or bolts. Installation of the winch assembly 200 may further include placing the electronic components of the winch assembly 200 in communication with the control assembly 150, for example by connecting a wire harness 269 between the control assembly 150 and the PCB 260.

The housing 220 generally includes a horizontal guide passage 222 positioned between the guide 216 and the heating element 202, and a vertical guide passage 224 having a lower end open to a receiving space 226. A first segment 248 of the line 240 extends through funnel-shaped opening 217, the horizontal guide passage 222, and the heating coil 203 to a pulley wheel 206. From the pulley wheel 206, a second segment 249 of the line 240 extends through the vertical guide passage 224 to the receiving space 226. The free end portion 244 extends through a weight 290 such as a sinker to the gravity hook 280, to which the free end portion 244 is attached (e.g., tied).

Figures 6, 7:
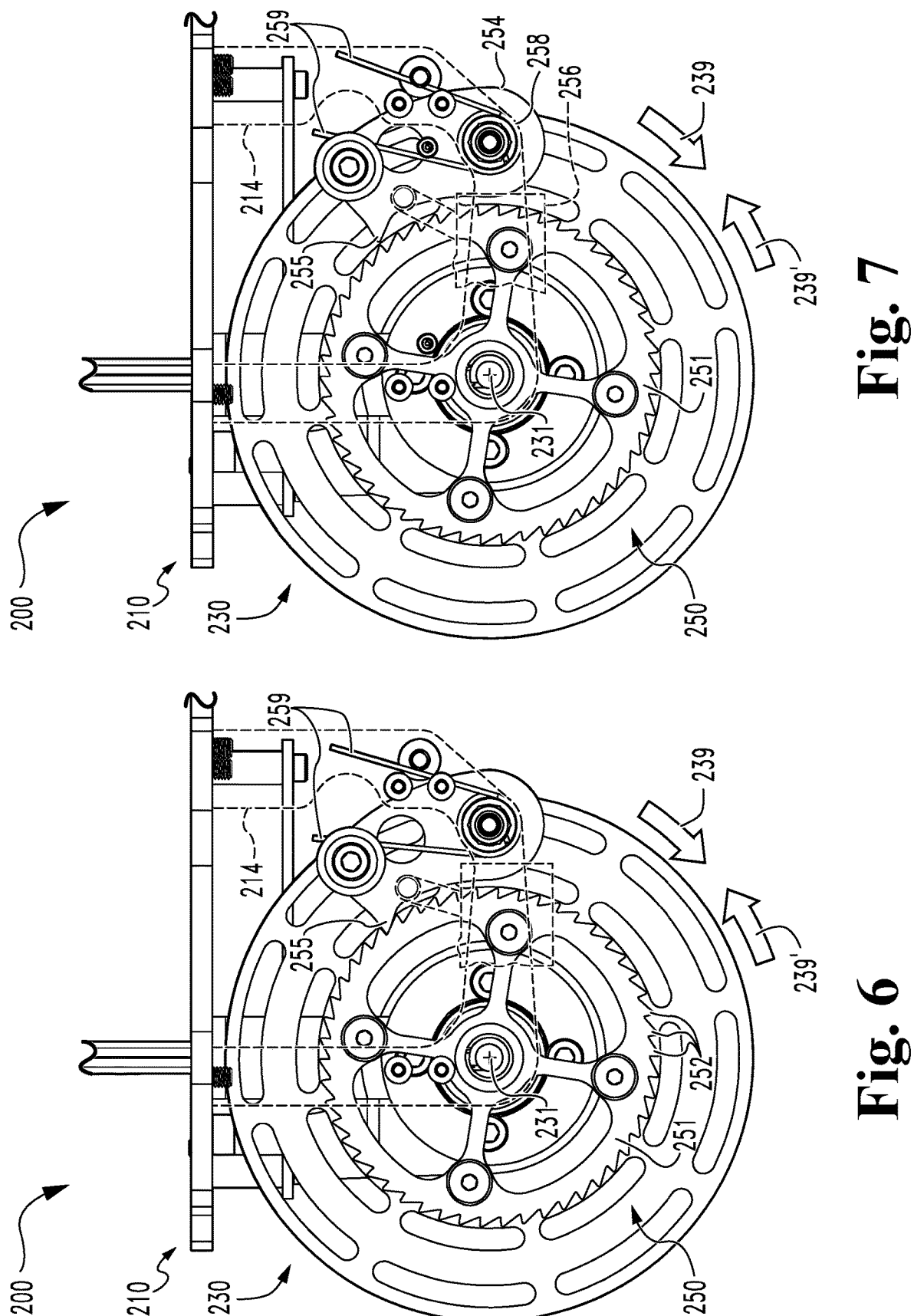
FIG. 6 is a plan view of a portion of the winch assembly with a brake mechanism according to certain embodiments in a locked state.
FIG. 7 is a plan view of a portion of the winch assembly with the brake mechanism in an unlocked state.

With additional reference to FIG. 6, the spool 230 is rotatable about a rotational axis 231, and includes a substantially cylindrical body 232 and a pair of sidewalls 234 positioned on opposite sides of the body 232. While other arrangements are contemplated, in the illustrated form, the rotational axis 231 is a substantially horizontal axis that extends transverse to the vertical central axis 101 of the UAV 100. The spool 230 is operable to rotate in an unwinding or line-lowering direction 239 and an opposite winding or line-raising direction 239'. As described herein, the motor 204 is operable to rotate the spool 230 in each of the unwinding direction 239 and the winding direction 239', and the brake mechanism 250 is operable to selectively prevent rotation of the spool 230 in at least the unwinding or line-lowering direction 239.

The line 240 has a wound portion 242 that is wound about the body 232 of the spool 230, and an opposite free end portion 244 that extends through the weight 290 and is connected (e.g. tied) to the gravity hook 280. In certain embodiments, the material of the line may be selected as one that is susceptible to burning and/or melting by the heating coil 203. In other embodiments, such as those in which the severing mechanism 202 is omitted or utilizes a blade, the line 240 may be formed of another type of material. In certain embodiments, the line 240 may be a monofilament line. In other embodiments, the line 240 may not necessarily be a monofilament line, and may, for example, be braided.

With additional reference to FIG. 7, the brake mechanism 250 is operable to selectively prevent rotation of the spool 230 in at least the unwinding direction, and has a holding state (FIG. 6) and a releasing state (FIG. 7). The brake mechanism 250 generally includes a brake wheel 251, a pawl 254 operable to engage the brake wheel 251, a brake actuator 256 operable to move the pawl 254 from a hold position (FIG. 6) to a release position (FIG. 7), and a bias member 258 biasing the pawl 254 toward the hold position.

Figure 8:
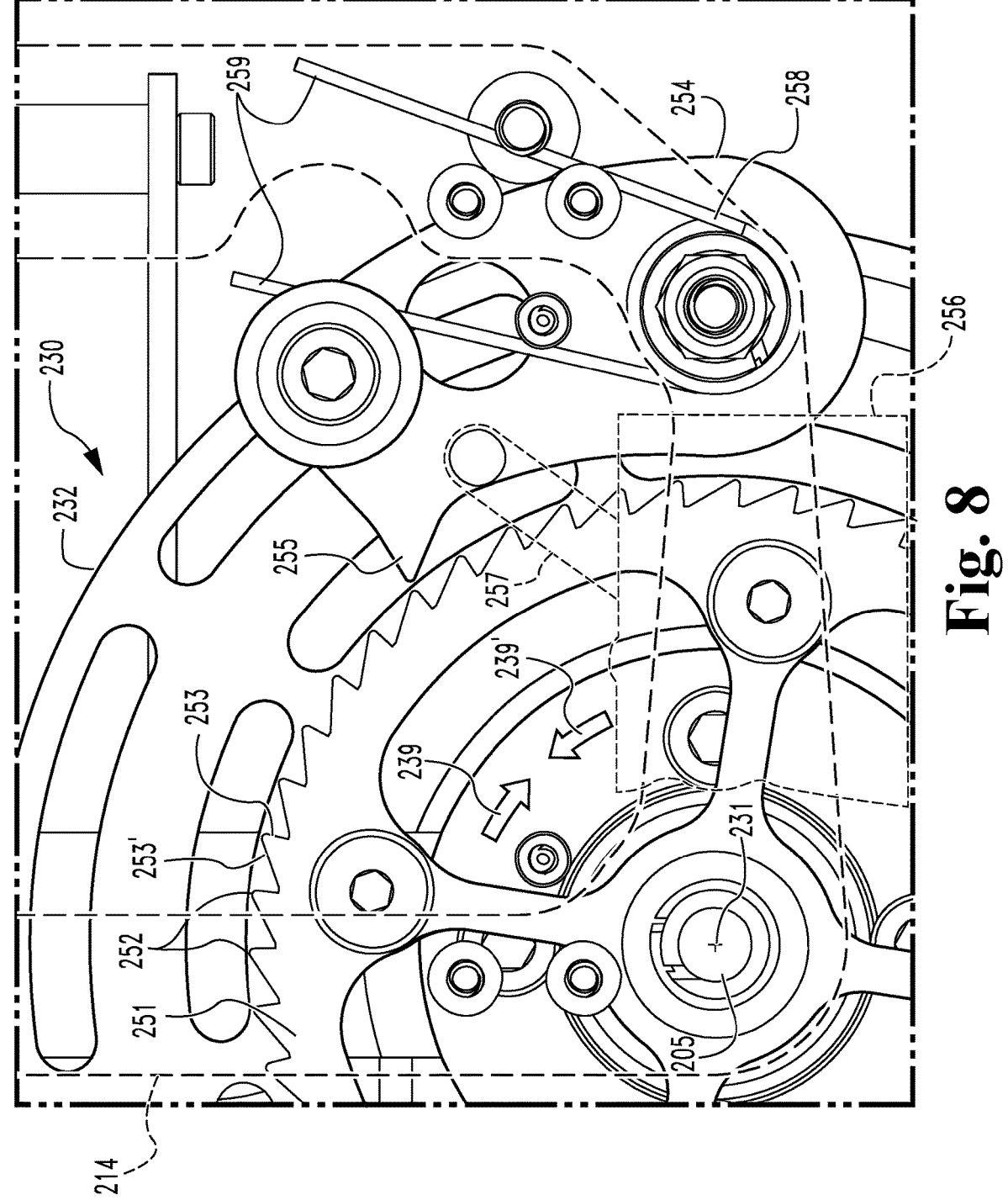
FIG. 8 is a plan view of a portion of the winch assembly with the brake mechanism in the unlocked state.

With additional reference to FIG. 8, the brake wheel 251 is secured to the spool 230 for joint rotation with the spool 230, and in the illustrated form includes a plurality of teeth 252. More particularly, the illustrated brake wheel 251 is provided in the form of a ratchet wheel in which each of the teeth 252 has a substantially radial holding edge 253 and an opposite oblique ramp edge 253'. During rotation of the spool 230 in the unwinding or line-lowering direction 239, the holding edge 253 is a leading edge of the tooth 252, and the ramp edge 253' is a trailing edge of the tooth 252. Conversely, during rotation of the spool 230 in the winding or line-raising direction 239', the ramp edge 253' is the leading edge of the tooth 252, and the holding edge 253 is the trailing edge of the tooth 252.

The pawl 254 includes a finger 255 operable to engage each of the radial edges 253 such that when the pawl 254 is in the hold position (FIG. 6), the pawl 254 prevents rotation of the brake wheel 251 in the unwinding or line-lowering direction 239, and thereby prevents rotation of the spool 230 in the line-lowering direction 239. In the illustrated form, the pawl 254 is mounted for pivotal movement between its hold position and its release position. It is also contemplated that the pawl 254 may be mounted for another form of movement between its hold position and its release position. For example, the pawl 254 may be mounted for linear movement between its hold position and its release position.

In the illustrated form, the brake actuator 256 is provided in the form of a servo motor, and moves the pawl 254 between its hold position and its release position in response to a lock/unlock signal, which may be transmitted by the controller 152 and/or the PCBA 260. More particularly, the servo motor includes a rotatable arm 257 that rotates in a first direction to place the pawl 254 in its hold position in response to a lock signal, and rotates in an opposite second direction to place the pawl 254 in its release position in response to an unlock signal. It is also contemplated that another form of actuator may be utilized as the brake actuator 256, such as another form of motor or a linear or rotary solenoid.

In the illustrated embodiment, the bias mechanism 258 is provided in the form of a torsion spring that includes a pair of legs 259. One of the legs 259 is engaged with the bracket 214 and the other leg 259 is engaged with the pawl 254 such that the pawl 254 is biased toward its hold position. It is also contemplated that the bias mechanism 258 may take another form, such as one including a compression spring, a tension spring, a leaf spring, an elastic member, and/or one or more magnets.

In the illustrated form, the brake wheel 251 is provided in the form of a ratchet wheel, and the brake mechanism 250 is configured to selectively prevent rotation of the spool 230 in the unwinding direction 239 without preventing rotation of the spool 230 in the winding direction 239'. During an attempted rotation of the brake wheel 251 in the unwinding direction 239, the holding edge 253 is the leading edge, and engages the finger 255 such that the pawl 254 prevents such rotation of the brake wheel 251. During attempted rotation of the brake wheel 251 in the winding direction 239', however, the oblique edge 253' is the leading edge, and urges the pawl 254 toward its release position. As a result, the motor 204 remains operable to raise the line 240 even when the brake mechanism 250 is in its holding state. It is also contemplated that the brake mechanism 250 may take another form. For example, the teeth 252 and/or finger 255 may instead be configured such that the pawl 254 prevents rotation of the brake wheel 251 in both directions 239, 239' when the pawl 254 is in its hold position.

While one example of a brake mechanism 250 has been thus far described, it should be appreciated that the brake mechanism 250 may take another form. For example, the winch assembly 200 may include a friction brake mechanism 250' (FIG. 3) in addition or as an alternative to the toothed brake mechanism 250. Such a friction brake mechanism 250' may, for example, operate in a failsafe mode in which the friction brake mechanism 250' permits rotation of the motor shaft 205 (and thus of the spool 230) only when an electrical current is provided, and which prevents rotation of the motor shaft 205 (and thus of the spool 230) when no current is provided.

Figure 9:
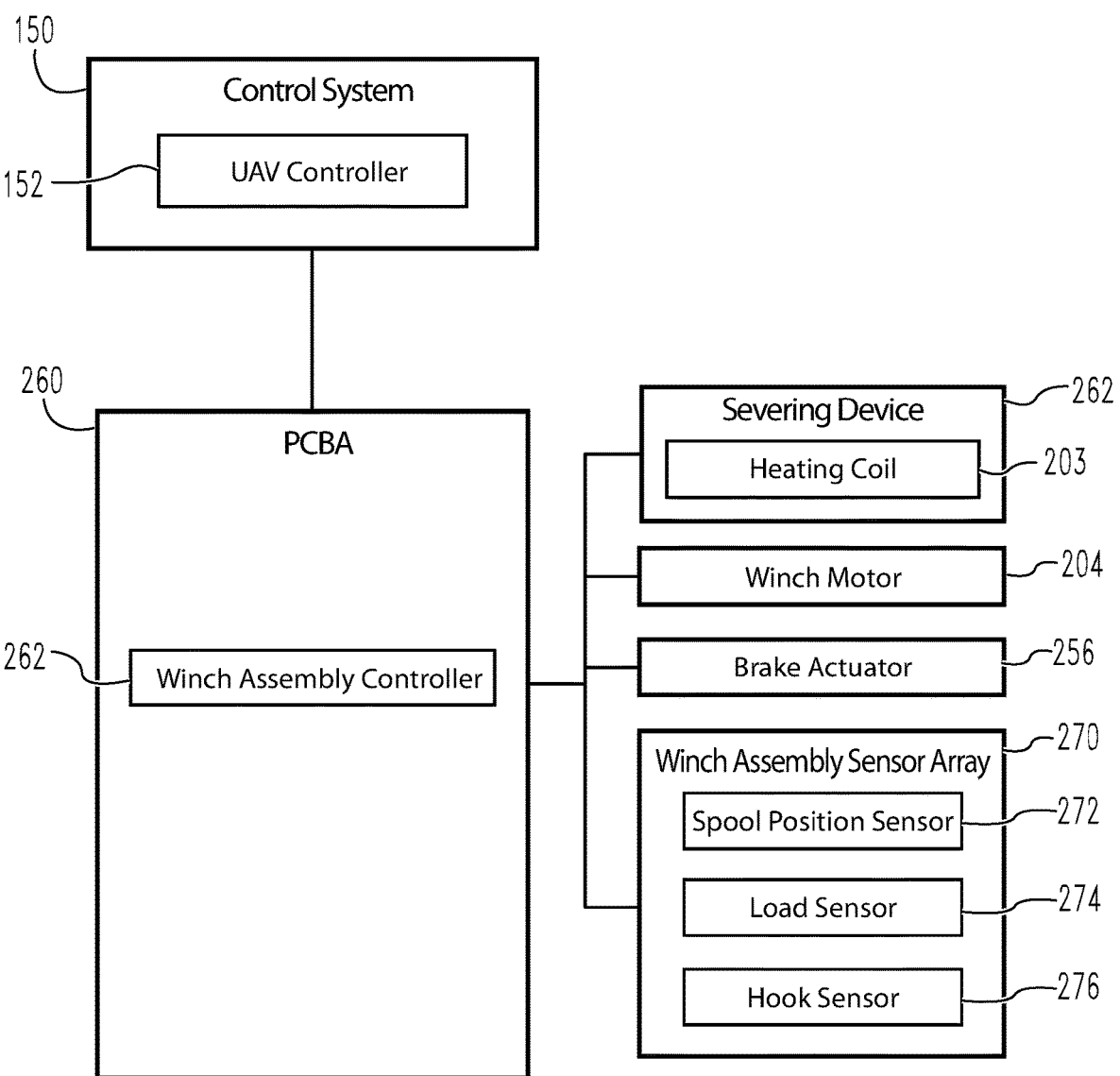
FIG. 9 is a schematic block diagram of the winch assembly.

With additional reference to FIG. 9, the PCBA 260 generally includes a printed circuit board (PCB) 261 configured for connection with the control system 150 (e.g., via a wire harness 269), and may further include a controller 262 operable to control and/or receive information from one or more electronic components of the winch assembly 200. It is also contemplated that one or more components of the winch assembly 200 may be directly controlled by the UAV controller 152, in which case the winch controller 262 may be omitted. However, it has been found that having a central hub through which the commands and/or sensor signals are routed may have certain advantages, such as those related to reducing the number of paths of electrical communication that need to be formed between the winch assembly 200 and the control system 150. For example, by routing commands and sensor signals through the PCBA 260, a single wire harness 269 may be utilized to connect the winch assembly 200 with the control system 150. Moreover, providing a dedicated controller 262 for the winch assembly 200 may reduce the complexity of the software and/or firmware needed in the control system 150, which may be advantageous in certain circumstances. In certain circumstances, the winch controller 262 may be considered to constitute a portion of the control system 150.

The illustrated winch assembly sensor array 270 generally includes a spool position sensor 272 operable to detect a rotational position of the spool 230, a load sensor 274 operable to detect when a parcel 90 is loaded onto the line 240, and a hook sensor 276 operable to detect when the gravity hook 280 is in a raised position.

In certain embodiments, the spool rotational position sensor 272 may include a rotary encoder and/or an inductive rotary position sensor. The control system 150 and/or the winch controller 262 may control operation of the winch motor 204 based at least in part upon information generated by the spool position sensor 272. For example, the control system 150 (and/or the winch controller 262) may be provided with (e.g., have stored in memory) information relating to the diameter of the spool body portion 232 such that the control system 150 (and/or the winch controller 262) is able to calculate the length of line 240 that has been paid out based upon the information provided by the rotary position sensor 272. More particularly, the control system 150 (and/or the winch controller 262) may calculate this length based upon the equation $L=\pi \cdot d \cdot n$, where L is the length of line 240 that has been paid out, d is the diameter of the body portion 232 of the spool 230, and n is the number of revolutions that the spool 230 has rotated as indicated by the information received from the rotary position sensor 272. For example, if the diameter of the reel is 20 cm and the rotary position sensor 272 indicates that the reel 310 has undergone ten revolutions in the line-lowering direction, the control system 150 (and/or the winch controller 262) may determine that the parcel 90 has dropped approximately 6.28 meters. This information can be compared with information generated by the downward-facing ranging-and-detection device 154b to determine how far the parcel 90 is from the ground or other designated delivery surface.

Figure 10:
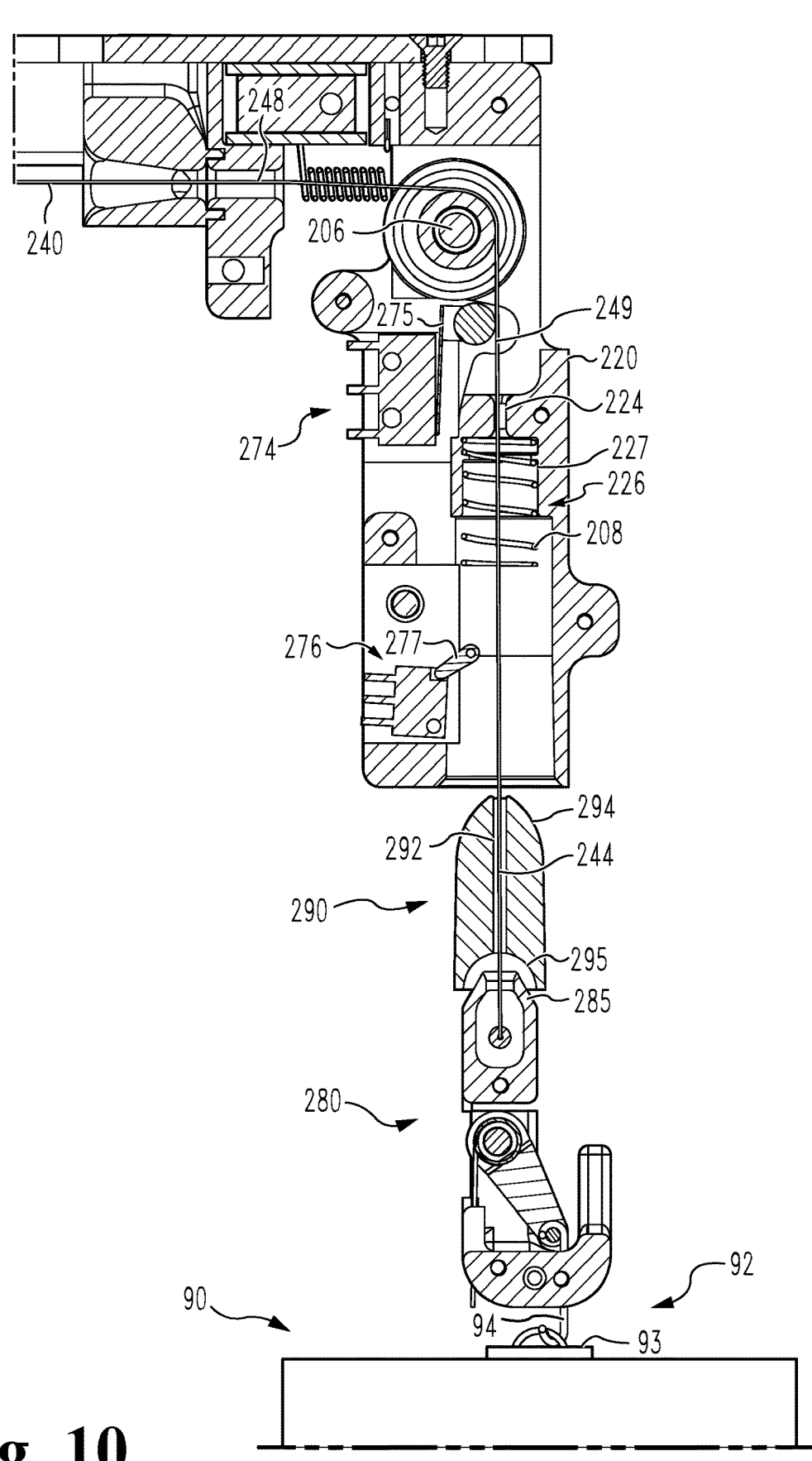
FIG. 10 is a cutaway view of a portion of the winch assembly during delivery of a parcel.

With additional reference to FIG. 10, the illustrated load sensor 274 is provided in the form of a mechanical snap-action switch including an actuating arm 275 that is biased toward a projected position, and is operable to move to a depressed position. Those skilled in the art will readily recognize that such snap-action switches have a default state (i.e., one of an open state or a closed state) when the arm 275 is in its projected position, and have a non-default state (i.e., the other of the open state or the closed state) when the arm 275 is in its depressed position. The load sensor 274 is mounted to the housing 220 and is positioned such that the arm 275 engages the line 240 between the pulley wheel 206 and the vertical guide passage 224. The position of the sensor 274 and the resiliency of the arm 275 are selected such that the arm 275 slightly deflects the line 240 when the gravity hook 280 is unloaded (FIG. 5). When a parcel 90 is attached to the gravity hook 280, the tension in the line 240 increases, thereby causing the line 240 to straighten and move the arm 275 to its depressed position (FIG. 10). Thus, the loaded/unloaded state of the line 240 can be determined based upon the default/non-default state of the load sensor 274.

In the illustrated embodiment, the hook sensor 276 is also provided in the form of a snap-action switch, and is mounted to the housing 220 such that its actuating arm 277 projects into the receiving space 226. When the gravity hook 280 is in its raised position (FIG. 5), the hook 280 and/or the weight 290 depresses the actuating arm 277, thereby placing the sensor 276 in its non-default state. When the hook 280 is lowered, the hook 280 and weight 290 exit the receiving space 226, thereby permitting the actuating arm 277 to return to its projected position in which the sensor 276 is in its default state. Thus, the raised/deployed position of the gravity hook 280 can be determined based upon the default/non-default state of the hook sensor 276. While one example of a hook sensor 276 has been provided, it should be appreciated that the hook sensor 276 may take another form. For example, the hook sensor 276 may instead include a magnetic sensor (e.g., a Hall effect sensor or reed switch), and the hook 280 and/or weight 290 may include a magnet that selectively actuates such a magnetic sensor when the hook 280 is in its raised position.

The gravity hook 280 is attached to the free end portion 244 of the line 240, and generally includes a hook body 281, a lever 286 pivotably mounted to the hook body 281, and a bias mechanism 288 biasing the lever 284 toward a closed position. The hook body 281 defines a hook recess 282 operable to receive a portion of a parcel connector 92, and a channel 283 that is defined between a pair of prongs 284. An upper end portion 285 of the hook body 281 is tapered, and is operable to be seated in a recessed portion 295 of the weight 290. The lever 286 has a pivot end and an opposite free end 287, and the free end 287 is received in the channel 283, which limits lateral movement of free end 287 and guides the lever 286 between its open position (FIG. 10) and its closed position (FIG. 5). The bias mechanism 288 biases the lever 286 toward its closed position, and in the illustrated form is provided in the form of a torsion spring. It is also contemplated that the bias mechanism 288 may take another form, such as one including a compression spring, a tension spring, a leaf spring, an elastic member, and/or one or more magnets.

In the illustrated form, the parcel 90 includes an attachment mechanism 92 that facilitates loading of the parcel 90 to the gravity hook 280. The attachment mechanism 92 generally includes a base portion 93 and a hoop 94 attached to the parcel 90 via the base portion 93. When the parcel 90 is loaded to the gravity hook 280, a portion of the hoop 94 is seated in the hook recess 282 and maintains the lever 284 in its open position. As the parcel 90 is lowered to the ground or other designated delivery surface, the weight of the parcel 90 becomes borne by the ground or other designated delivery surface, and the hoop 94 exits the recess 282 as the lever 284 returns to its closed position under the urging of the bias mechanism 288. Should the hoop 94 fail to disengage from the gravity hook 280, the UAV 100 may perform an iterative disengagement procedure, for example as described below with reference to FIG. 11.

The weight 290 includes a through-passage 292 through which the line 240 extends, and has a tapered upper end portion 294 and a recessed lower end portion 295. A compression spring 208 is mounted in the receiving space 226, and the tapered upper end portion 294 is sized and shaped to engage the spring 208 when the gravity hook 280 is in its raised position (FIG. 5). As described herein, the compression spring 208 may aid in seating the weight 290 and hook 280, and/or facilitate the operation of the brake mechanism 250. The recessed portion 295 receives the tapered upper end portion 285 of the hook body 281, thereby encouraging the upper end portion 285 to nest in the recessed portion 295.

Figures 11, 12:
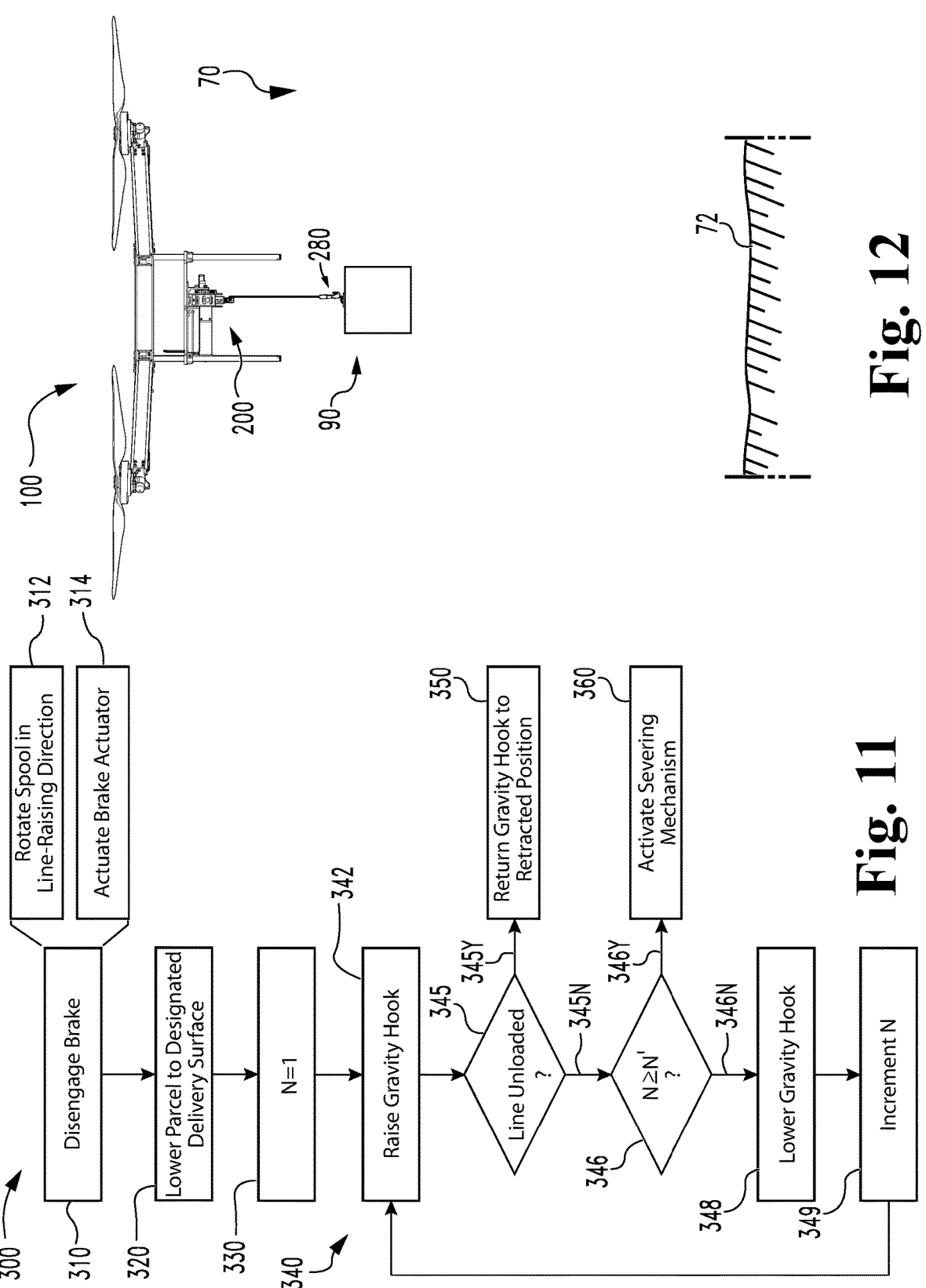
FIG. 11 is a schematic flow diagram of a process according to certain embodiments.
FIG. 12 illustrates the UAV during delivery of a parcel to a designated delivery zone.

With additional reference to FIG. 11, illustrated therein is an example process 300 that may be performed using the UAV 100 and winch assembly 200. Blocks illustrated for the processes in the present application are understood to be examples only, and blocks may be combined or divided, and added or removed, as well as re-ordered in whole or in part, unless explicitly stated to the contrary. Unless specified to the contrary, it is contemplated that certain blocks performed in the process 300 may be performed wholly by the control system 150 and/or the winch controller 262, or that the blocks may be distributed among one or more of the elements and/or additional devices or systems that are not specifically illustrated in FIGS. 1-10. Additionally, while the blocks are illustrated in a relatively serial fashion, it is to be understood that two or more of the blocks may be performed concurrently or in parallel with one another. Moreover, while the process 300 is described herein with specific reference to the UAV 100 and winch assembly 200 illustrated in FIGS. 1-10, it is to be appreciated that the process 300 may be performed with UAVs and/or winch assemblies having additional and/or alternative features.

With additional reference to FIG. 12, the process 300 generally involves delivering a parcel 90 to a designated delivery surface 72 and may, for example, be performed after the parcel 90 has been loaded to the gravity hook 280 and the UAV 100 has been navigated to a delivery destination 70 including the designated delivery surface 72. As described herein, the process 300 may facilitate the disengagement of the parcel 90 from the gravity hook 280 in the event that the parcel 90 becomes stuck on the gravity hook 280.

The process 300 may begin with the UAV 100 hovering a known height above the designated surface 72, with the gravity hook 280 in its raised position, and the brake mechanism 250 in its locked state. In this state, the weight 290 may be engaged with the spring 208, but is not fully seated in the spring seat 227 of the receiving space 226. Thus, the spring 208 maintains a certain degree of tension in the line 240, but permits a small degree of upward movement for the weight 290. Moreover, with the brake mechanism 250 in its locked state, rotation of the spool 230 in the unwinding or line-lowering direction 239 is prevented. Thus, the brake mechanism 250 prevents lowering of the line 240 during travel (e.g., travel to the delivery destination 70), thereby obviating the need for providing the motor 204 with a holding current during such travel. Because the illustrated brake mechanism 250 is mechanically biased toward the locked state, the brake mechanism 250 is capable of holding the gravity hook 280 in its raised position without requiring power. As a result, the illustrated winch assembly 200 is capable of retaining the gravity hook 280 in its raised position during travel without requiring electrical power, which may conserve such electrical power, thereby extending the operational battery life of the UAV 100.

With the UAV 100 hovering at the destination (e.g., above the designated delivery surface 72), the process 300 may begin with block 310, which generally involves disengaging the brake mechanism 250. As will be appreciated, the tension in the loaded line 240 may result in generation of a frictional force at the interface between the pawl finger 255 and the holding edge 253 engaged therewith, and such a frictional force may impede the movement of the pawl 254 from its hold position to its release position. In order to reduce this frictional force and facilitate movement of the pawl 254 to its release position, block 310 may include block 312, which generally involves rotating the spool 230 (and thus the ratchet wheel 251) in the winding or line-raising direction 239' by a relatively small amount, thereby disengaging the finger 255 from the holding edge 253. Block 312 may, for example, involve the UAV controller 152 (and/or the winch controller 262) transmitting to the motor 204 a line-raising signal that causes the motor 204 to rotate the motor shaft 205 in the line-raising direction.

With the finger 255 disengaged from the holding edge 253, block 310 may proceed to block 314, which generally involves actuating the brake actuator 256 to thereby transition the brake mechanism 250 to its unlocked state. For example, block 314 may involve the UAV controller 152 (and/or the winch controller 262) transmitting to brake actuator 256 an unlock signal that causes the actuator armature 257 to drive the pawl 254 from its hold position (FIG. 6) to its release position, thereby unlocking the spool 230 and permitting rotation of the spool 230 in the line-lowering direction 239.

With the spool 230 unlocked for rotation in the line-lowering direction, the process 300 may continue to block 320, which generally involves lowering the parcel 90 to the designated delivery surface 72. Block 320 may, for example, involve operating the motor 204 to rotate the spool 230 in the line-lowering direction 392 until the parcel 90 rests on the delivery surface 72, after which the hoop 94 should disengage from the gravity hook 280 as described above. As will be appreciated, the unlock signal may be maintained during lowering of the parcel 90 in block 320 to ensure that the spool 230 remains free to rotate in the line-lowering direction 239. In certain embodiments, block 320 may involve operating the motor 204 until the length of line 240 paid out (e.g., as determined based on information generated by the spool position sensor 272) corresponds to the hover height of the UAV 100 (e.g., as indicated by the downward-facing ranging-and-detection device 154b).

Upon completion of block 320, the number of attempts to release the parcel 90 from the gravity hook 280 may be considered to be one. The process 300 may continue to block 330, which generally involves setting a counting variable N equal to a predetermined value, such as one. As described herein, the counting variable N may be utilized to track the number of attempts to release the parcel 90.

After an attempt to release the parcel 90 in block 320, the process 300 may continue to an iterative procedure 340. The iterative procedure 340 may begin with block 342, which generally involves raising the gravity hook 280, for example by operating the motor 204 to rotate the spool 230 in the line-raising direction 239' and/or increasing the hover height of the UAV 100.

Upon raising the gravity hook 280 in block 342, the iterative procedure 340 may continue to block 345, which generally involves determining whether the line 240 remains loaded. In situations in which the parcel 90 has successfully disengaged from the gravity hook 280, the gravity hook 280 may be free to raise, and the reduced tension in the line 240 may cause the load sensor 274 to return to its default state as described above, thereby indicating that the parcel 90 has been successfully released. In response to the successful release of the parcel 90, the process 300 may continue along path 345Y to block 350, which generally involves returning the gravity hook 280 to its raised position. Block 350 may, for example, operating the motor 204 to rotate the spool 230 in the line-raising direction until information generated by the hook sensor 276 indicates that the gravity hook 280 has reached its raised position. In certain embodiments, the brake actuator 254 may remain actuated during retraction of the gravity hook 280 such that the pawl 256 remains in its release position during winding of the line 240. It is also contemplated that the brake actuator 254 may be unactuated during at least a portion of block 350, and the ratcheting action of the illustrated brake mechanism 250 may permit rotation of the spool 230 in the winding direction 239'.

In situations in which the parcel 90 remains engaged with the gravity hook 280, the attempted raising of the gravity hook 280 with the parcel 90 still attached will cause the load sensor to adopt is non-default state, thereby indicating that the parcel 90 has not been successfully released. In response to a determination that the parcel 90 has not been successfully released, the process 300 may continue along path 345N to block 346, which generally involves comparing the counting variable N with a threshold value N'. The threshold value N' may be a predetermined value corresponding to the number of desired attempts to release the parcel 90 normally before severing the line 240, and is preferably greater than one. The threshold value N' may, for example, be two, or three, or four, or another value.

In response to a determination that the number of release attempts (corresponding to the counting variable N) meets or exceeds the threshold number of attempts (corresponding to the threshold value N'), the process 300 may continue along path 346Y to block 360, which generally involves severing the line 240, for example by transmitting to the severing mechanism 202 a sever signal. Block 360 may, for example, involve providing the heating coil 203 with a current that causes the heating coil 203 to heat to a temperature sufficient to melt and/or burn the line 240.

In response to a determination that the number of release attempts (corresponding to the counting variable N) does not meet or exceed the threshold number of attempts (corresponding to the threshold value N'), the process 300 may continue along path 346N to block 348, which generally involves lowering the gravity hook 280 to once again attempt to disengage the parcel 90 from the gravity hook 280. Block 348 may, for example, involve reducing the hover height of the UAV 100 and/or operating the motor 204 to rotate the spool 230 in the line-lowering direction. With the number of release attempts increased by one, the counting variable N may be incremented in block 349, and the process 300 may return to block 342 to perform another iteration of the iterative procedure 340.

Figure 13:
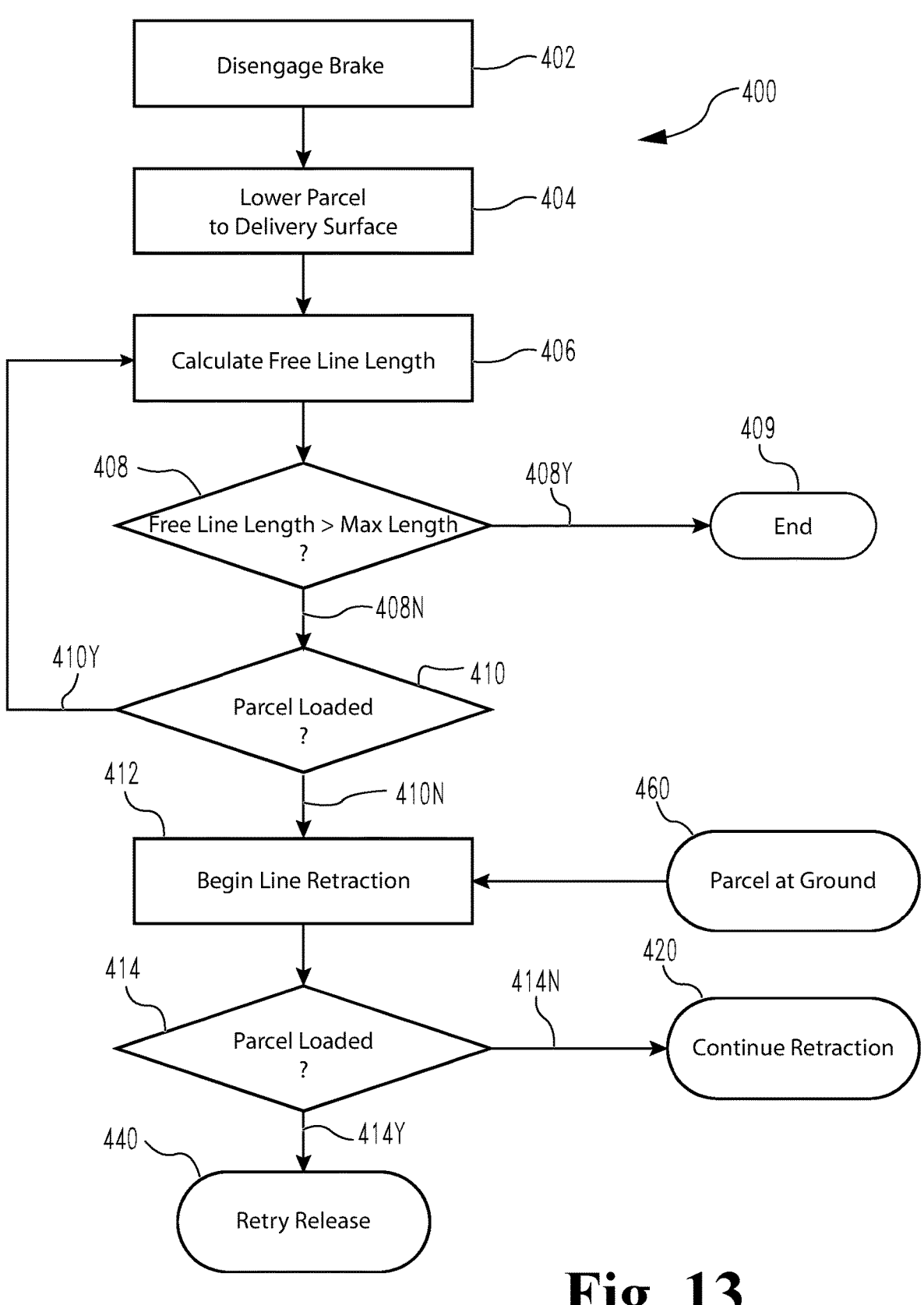
FIGS. 13-15 are schematic flow diagrams of a process according to certain embodiments.

With additional reference to FIG. 13, illustrated therein is an example process 400 that may be performed using the UAV 100 and winch assembly 200. Blocks illustrated for the processes in the present application are understood to be examples only, and blocks may be combined or divided, and added or removed, as well as re-ordered in whole or in part, unless explicitly stated to the contrary. Unless specified to the contrary, it is contemplated that certain blocks performed in the process 400 may be performed wholly by the control system 150 and/or the winch controller 262, or that the blocks may be distributed among one or more of the elements and/or additional devices or systems that are not specifically illustrated in FIGS. 1-10. Additionally, while the blocks are illustrated in a relatively serial fashion, it is to be understood that two or more of the blocks may be performed concurrently or in parallel with one another. Moreover, while the process 400 is described herein with specific reference to the UAV 100 and winch assembly 200 illustrated in FIGS. 1-10, it is to be appreciated that the process 400 may be performed with UAVs and/or winch assemblies having additional and/or alternative features.

The process 400 may begin with the UAV 100 hovering above the delivery surface 72 and the parcel 90 loaded to the gravity hook 280 with the gravity hook 280 in its retracted or raised position. From this state, the process 400 may proceed to block 402, which generally involves disengaging the brake mechanism 250. In the illustrated form, block 402 may, for example, involve transmitting a release signal that causes the pawl actuator 256 to move to its release position, thereby moving the ratchet mechanism to its disengaged state.

With the brake mechanism 250 disengaged, the process 400 may continue to block 404, which generally involves lowering the parcel 90 toward the delivery surface 72. Block 404 may, for example, involve transmitting to the winch motor 204 a line-lowering signal that causes the motor 204 to rotate the spool 230 in the line-lowering direction.

As will be appreciated, lowering the parcel 90 increases the length of the free portion of the line 240. In certain embodiments, the process 400 may involve block 406, which generally involves calculating the length of the free portion of the line 240, for example as described above. In such forms, the process 400 may continue to block 408, which generally involves comparing the length of the free portion of the line 240 to a maximum permitted length for the free portion of the line 240. If the free length of the line 240 exceeds the maximum permitted length, the process 400 may proceed along path 408Y to block 409, which generally involves ending the process 400. In certain circumstances, block 409 may, for example, involve activating the severing device 202 to sever the line 240.

If the free length of the line 240 does not exceed the maximum permitted length, the process 400 may continue along path 408N to block 410, which generally involves determining whether the parcel 90 remains loaded on the line 240. Block 410 may, for example, involve determining whether the parcel 90 remains loaded based upon the information generated by the load sensor 274. If the parcel 90 remains loaded, the process 400 may return along path 410Y to block 406, where the determination regarding the free length of the line is updated.

If the parcel 90 is not loaded (e.g., if the load sensor 274 is deactivated), this may indicate that the parcel 90 has reached the delivery surface 72. In such circumstances, the process 400 may continue along path 410N to block 412, which generally involves beginning a line retraction procedure. For example, block 412 may involve stopping the rotation of the spool 230 in the line-lowering direction, deactuating the pawl actuator 256 to re-engage the ratchet mechanism 250, and causing the winch motor 204 to begin rotating the spool 230 in the line-raising direction. In certain forms, block 412 may involve operating the winch motor 204 at a relatively high speed to retract the line 240 quickly. As described herein, the speed at which the winch motor 204 is operated may be reduced once the hook 280 reaches a threshold height.

With the motor 204 rotating the spool 230 to retract the line 240, the process 400 may continue to block 414, which generally involves determining whether the parcel 90 remains loaded on the line 240 (e.g., based upon information generated by the load sensor 274). If the line 240 is unloaded, the process 400 may continue along path 414N to block 420, which generally involves continuing to retract the line 240, for example as described below in connection with FIG. 14. If the line 240 remains loaded, the process 400 may continue along path 414Y to block 440, which generally involves performing a retry release procedure, for example as described below in connection with FIG. 15.

Figures 14, 15:
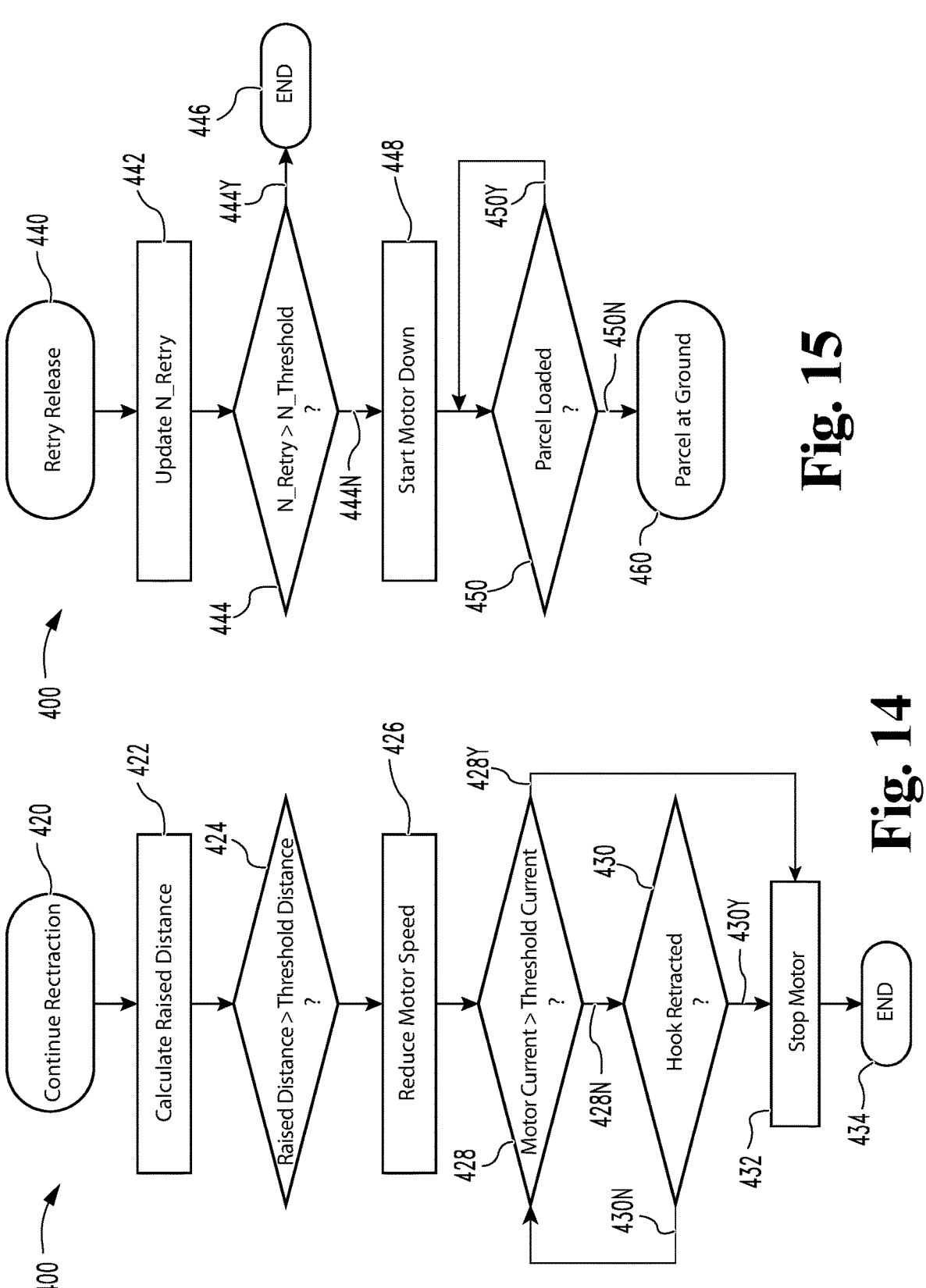

With additional reference to FIG. 14, from block 420, the process 400 may continue to block 422, which generally involves calculating the distance by which the hook 280 has been raised. The process 400 may then continue to block 424, which generally involves comparing the raised distance to a threshold distance. In certain embodiments, the threshold distance may be dependent upon the hover height of the UAV 100. In certain embodiments, the threshold distance may be independent of the hover height of the UAV 100. In either case, when the raised distance does not exceed the threshold distance, the process 400 may return along path 424N to block 422, where the calculation regarding the raised distance is updated.

When the raised distance exceeds the threshold distance, the process 400 may continue along path 424Y to block 426, which generally involves reducing the speed of the winch motor 204. Thus, while a portion of the line retracting procedure involves operating the motor 204 at the relatively high speed described above, a latter portion of the line retracting procedure may involve operating the motor 204 at a relatively lower speed, which may aid in reducing tangles and/or in reducing the likelihood of damage to one or more components of the UAV 100 when the hook 280 reaches its fully raised position.

With the motor speed reduced and the gravity hook 280 approaching its raised position, the process 400 may proceed to block 428, which generally involves comparing the current drawn by the winch motor 204 to a threshold current. If the motor current exceeds the threshold current, this may indicate that the spool 230 has reached a hard stop position, and the process 400 may continue along path 428Y to block 432, which generally involves stopping rotation of the winch motor 204.

If the motor current does not exceed the threshold current, the process 400 may proceed along path 428N to block 430, which generally involves determining whether the hook 280 is in its retracted or raised position. Block 430 may, for example, involve determining whether the hook 280 is in its raised position based upon information generated by the hook sensor 276. If the hook 280 is not in its raised position, the process 400 may return along path 430N to block 428, where the motor current is once again compared to the threshold current.

When the hook 280 is in its raised position, the process 400 may continue from block 430 along path 430Y to block 432, which generally involves stopping the winch motor 204. From block 432, the process 400 may continue to block 434, which terminates the process 400. With the process 400 successfully completed, the parcel 90 has been delivered, and the UAV 100 may return to a base station for recharging and/or reloading with a new parcel.

With additional reference to FIG. 15, from block 440, the process 400 may proceed to block 442, which generally involves updating a retry variable N_Retry, for example by incrementing N_Retry by one. The process 400 may then proceed to block 444, which generally involves comparing the retry variable N_Retry to a threshold number of retries N_Threshold. If the retry variable N_Retry exceeds the threshold number of retries N_Threshold, the process 400 may continue along path 444Y to block 446, which generally involves ending the process 400. In certain circumstances, block 446 may, for example, involve activating the severing device 202 to sever the line 240.

When the retry variable N_Retry does not satisfy the threshold number of retries N_Threshold, the process 400 may continue along path 444N to block 448, which generally involves stopping the winch motor 204, and restarting the motor 204 to lower the gravity hook 280. Block 448 may further include setting a flag indicating that the parcel 90 is stuck on the gravity hook 280.

From block 448, the process 400 may continue to block 450, which generally involves determining whether the parcel 90 remains loaded on the line 240 (e.g., based upon information generated by the load sensor 274). If the line 240 remains loaded, the process 400 may return along path 450Y such that the gravity hook 280 continues to be lowered until the parcel 90 is supported by the delivery surface 72.

When the parcel 90 is supported by the delivery surface 72, the information generated by the load sensor 274 indicates that the line 240 is unloaded. In response to such an indication, the process 400 may continue along path 450N to block 460, at which point the parcel 90 is supported by the delivery surface 92. As illustrated in FIG. 13, the process 400 may proceed from block 460 to block 412, in which retraction of the line 240 is once again commenced.

Figure 16:
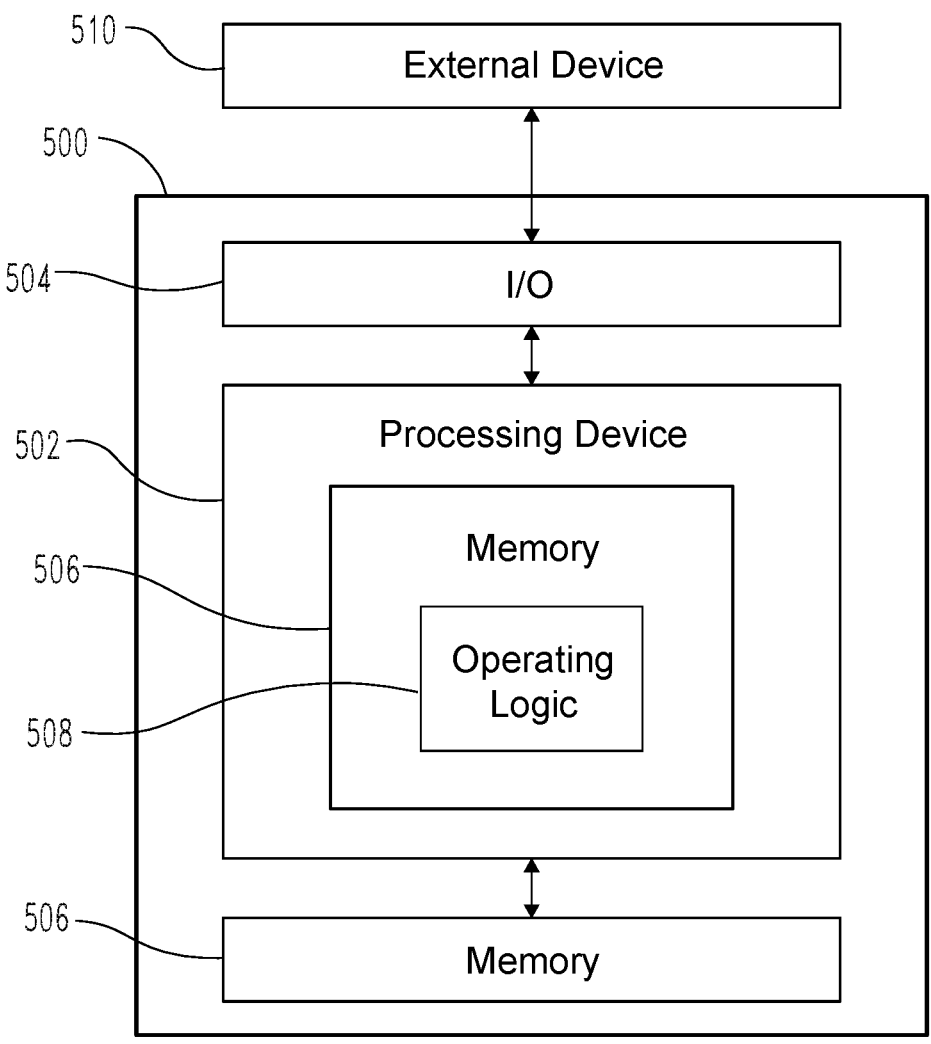
FIG. 16 is a schematic block diagram of a computing device that may be utilized in connection with certain embodiments.

Referring now to FIG. 16, a simplified block diagram of at least one embodiment of a computing device 500 is shown. The illustrative computing device 500 depicts at least one embodiment of a controller that may be utilized in connection with the controller 152 illustrated in FIG. 2 and/or the controller 262 illustrated in FIG. 9.

Depending on the particular embodiment, the computing device 500 may be embodied as a server, desktop computer, laptop computer, tablet computer, notebook, netbook, Ultrabook™ mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 500 includes a processing device 502 that executes algorithms and/or processes data in accordance with operating logic 508, an input/output device 504 that enables communication between the computing device 500 and one or more external devices 510, and memory 506 which stores, for example, data received from the external device 510 via the input/output device 504.

The input/output device 504 allows the computing device 500 to communicate with the external device 510. For example, the input/output device 504 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 500. The input/output device 504 may include hardware, software, and/or firmware suitable for performing the techniques described herein.

The external device 510 may be any type of device that allows data to be inputted or outputted from the computing device 500. For example, in various embodiments, the external device 510 may be embodied as the external device 80, the rotor motor 126, the power supply 140, the controller 152, the ranging and detection device(s) 154, the primary sensor array 156, the wireless communication device(s) 158, the severing device 202, the winch motor 204, the pawl actuator 256, the controller 262, or and/or the winch assembly sensor array 270. Further, in some embodiments, the external device 510 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 510 may be integrated into the computing device 500.

The processing device 502 may be embodied as any type of processor(s) capable of performing the functions described herein. In particular, the processing device 502 may be embodied as one or more single or multi-core processors, microcontrollers, or other processor or processing/controlling circuits. For example, in some embodiments, the processing device 502 may include or be embodied as an arithmetic logic unit (ALU), central processing unit (CPU), digital signal processor (DSP), and/or another suitable processor(s). The processing device 502 may be a programmable type, a dedicated hardwired state machine, or a combination thereof. Processing devices 502 with multiple processing units may utilize distributed, pipelined, and/or parallel processing in various embodiments. Further, the processing device 502 may be dedicated to performance of just the operations described herein, or may be utilized in one or more additional applications. In the illustrative embodiment, the processing device 502 is of a programmable variety that executes algorithms and/or processes data in accordance with operating logic 508 as defined by programming instructions (such as software or firmware) stored in memory 506. Additionally or alternatively, the operating logic 508 for processing device 502 may be at least partially defined by hardwired logic or other hardware. Further, the processing device 502 may include one or more components of any type suitable to process the signals received from input/output device 504 or from other components or devices and to provide desired output signals. Such components may include digital circuitry, analog circuitry, or a combination thereof.

The memory 506 may be of one or more types of non-transitory computer-readable media, such as a solid-state memory, electromagnetic memory, optical memory, or a combination thereof. Furthermore, the memory 506 may be volatile and/or nonvolatile and, in some embodiments, some or all of the memory 506 may be of a portable variety, such as a disk, tape, memory stick, cartridge, and/or other suitable portable memory. In operation, the memory 506 may store various data and software used during operation of the computing device 500 such as operating systems, applications, programs, libraries, and drivers. It should be appreciated that the memory 506 may store data that is manipulated by the operating logic 508 of processing device 502, such as, for example, data representative of signals received from and/or sent to the input/output device 504 in addition to or in lieu of storing programming instructions defining operating logic 508. As illustrated, the memory 506 may be included with the processing device 502 and/or coupled to the processing device 502 depending on the particular embodiment. For example, in some embodiments, the processing device 502, the memory 506, and/or other components of the computing device 500 may form a portion of a system-on-a-chip (SoC) and be incorporated on a single integrated circuit chip.

In some embodiments, various components of the computing device 500 (e.g., the processing device 502 and the memory 506) may be communicatively coupled via an input/output subsystem, which may be embodied as circuitry and/or components to facilitate input/output operations with the processing device 502, the memory 506, and other components of the computing device 500. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 500 may include other or additional components, such as those commonly found in a typical computing device (e.g., various input/output devices and/or other components), in other embodiments. It should be further appreciated that one or more of the components of the computing device 500 described herein may be distributed across multiple computing devices. In other words, the techniques described herein may be employed by a computing system that includes one or more computing devices. Additionally, although only a single processing device 502, I/O device 504, and memory 506 are illustratively shown in FIG. 16, it should be appreciated that a particular computing device 500 may include multiple processing devices 502, I/O devices 504, and/or memories 506 in other embodiments. Further, in some embodiments, more than one external device 510 may be in communication with the computing device 500.

Certain embodiments of the present application relate to an unmanned aerial vehicle, comprising: a control system; at least one rotor operable to generate lift under control of the control system; a spool mounted for rotation in a winding direction and an unwinding direction opposite the winding direction; a motor operable to rotate the spool in at least the winding direction under control of the control system; and a brake mechanism including a brake actuator operable to transition the brake mechanism between a locked state and an unlocked state under control of the control system; wherein the brake mechanism in the locked state prevents rotation of the spool in at least the unwinding direction; and wherein the brake mechanism in the unlocked state does not prevent rotation of the spool in the unwinding direction.

In certain embodiments, the brake mechanism in the locked state does not consume electrical power.

In certain embodiments, the unmanned aerial vehicle further comprises a line including a wound portion wound about the spool and a free portion; wherein rotation of the spool in the winding direction winds the line onto the spool; and wherein rotation of the spool in the unwinding direction unwinds the line from the spool.

In certain embodiments, with the brake mechanism in the locked state, rotation of the spool in the unwinding direction is prevented without requiring that the motor be supplied with a holding power.

In certain embodiments, the brake mechanism further comprises: a ratchet wheel rotationally coupled with the spool, the ratchet wheel comprising a plurality of ratchet teeth; and a pawl having a hold position corresponding to the locked state and a release position corresponding to the unlocked state; wherein the pawl in the hold position is engaged with one or more of the ratchet teeth and prevents rotation of the spool in the unwinding direction; wherein the pawl in the release position is disengaged from the ratchet wheel and does not prevent rotation of the spool in the unwinding direction; and wherein the brake actuator is operable to move the pawl from the hold position to the release position.

In certain embodiments, the pawl is biased toward the hold position.

In certain embodiments, the brake mechanism in the locked state is configured to permit rotation of the spool in the winding direction.

Certain embodiments of the present application relate to an unmanned aerial vehicle, comprising: a control system; at least one rotor operable to generate lift under control of the control system; a spool mounted for rotation in a winding direction and an unwinding direction opposite the winding direction; a motor operable to rotate the spool under control of the control system; and a brake mechanism operable to selectively prevent rotation of the spool in at least the unwinding direction, the brake mechanism comprising a brake actuator operable to move the brake mechanism from a locked state to an unlocked state under control of the control system; wherein the control system is configured to selectively unlock the brake mechanism; and wherein to unlock the brake mechanism comprises operating the motor to rotate the spool in the winding direction, and thereafter operating the brake actuator to move the brake mechanism from the locked state to the unlocked state.

In certain embodiments, the brake mechanism further comprises: a toothed wheel coupled with the spool, the toothed wheel comprising a plurality of teeth, each tooth including a corresponding and respective holding edge; a pawl having a hold position in which the pawl is operable to engage at least one of the holding edges, and a release position in which the pawl is disengaged from the toothed wheel; wherein to move the brake mechanism from the locked state to the unlocked state comprises moving the pawl from the hold position to the release position; and wherein rotation of the spool in the winding direction disengages the pawl from the at least one holding edge.

In certain embodiments, the toothed wheel is a ratchet wheel, and each tooth further comprises a corresponding and respective ramp edge opposite the holding edge.

In certain embodiments, the pawl is biased toward the hold position.

In certain embodiments, the unmanned aerial vehicle further comprises: a chassis, wherein the spool is mounted for rotation relative to the chassis; a line including a wound portion wound about the spool and a free portion; an attachment device coupled to the free portion and configured to facilitate attachment of a parcel to the line; and a spring engaged between the chassis and the attachment device when the attachment device is in a raised position.

In certain embodiments, with the attachment device in the raised position, rotation of the spool in the winding direction causes the attachment device to raise from the raised position, thereby compressing the spring.

In certain embodiments, the unmanned aerial vehicle further comprises a weight attached to the line between the spring and the attachment device; wherein, with the attachment device in the raised position, the spring is engaged with the attachment device via the weight.

In certain embodiments, the spring is a coil spring; and wherein the weight comprises a tapered upper end portion that engages a lower end of the coil spring when the attachment device is in the raised position.

Certain embodiments of the present application relate to a method of operating an unmanned aerial vehicle (UAV), the method comprising: placing an attachment mechanism in a raised position relative to the UAV, wherein the attachment mechanism is attached to a free portion of a line having a wound portion that is wound about a spool rotatably mounted to a chassis of the UAV, wherein rotation of the spool in a winding direction raises the attachment mechanism, and wherein rotation of the spool in an unwinding direction lowers the attachment mechanism; placing a brake mechanism in a locked state, wherein the brake mechanism in the locked state prevents rotation of a spool in the unwinding direction; operating the motor to rotate the spool in the winding direction, thereby facilitating unlocking of the brake mechanism; and operating a brake actuator to move the brake mechanism to an unlocked state, thereby facilitating rotation of the spool in the unwinding direction.

In certain embodiments, the method further comprises: operating the motor to rotate the spool in the unwinding direction, thereby unwinding the line from the spool and lowering the attachment device; and maintaining the brake mechanism in the unlocked state during unwinding of the line from the spool and lowering of the attachment device.

In certain embodiments, the brake mechanism comprises a pawl having a hold position in the locked state and a release position in the unlocked state; wherein the pawl is operable to engage a holding edge when the brake mechanism is in the locked state to thereby prevent rotation of the spool in the winding direction; and wherein facilitating unlocking of the brake mechanism comprises disengaging the pawl from the holding edge, thereby reducing forces associated with moving the pawl from the hold position to the release position.

In certain embodiments, the method further comprises mechanically biasing the pawl toward the hold position.

In certain embodiments, placing the attachment mechanism in the raised position comprises: operating the motor to rotate the spool in the winding direction; and ceasing operation of the motor in response to information generated by a sensor indicating that the attachment device has reached the raised position.

Certain embodiments of the present application relate to an unmanned aerial vehicle, comprising: a chassis; a control system mounted to the chassis; at least one rotor operable to generate lift under control of the control system; a spool having a wound portion of a line wound thereon, the line including a free portion; an attachment device secured to the free portion of the line and configured to facilitate attachment of a parcel to the line; a motor operable to rotate the spool under control of the control system such that the control system is operable to raise the attachment device to a raised position and lower the attachment device from the raised position; and a spring positioned between the chassis and the attachment device such that the spring is engaged between the chassis and the attachment device when the attachment device is in the raised position.

In certain embodiments, wherein the spring is a coil spring; and wherein the line passes through the coil spring.

In certain embodiments, the spring is secured to the chassis.

In certain embodiments, the chassis comprises a housing defining a receiving space; and wherein at least a portion of the attachment device is received in the receiving space when the attachment device is in the raised position.

In certain embodiments, the unmanned aerial vehicle further comprises a weight positioned on the line between the attachment device and the spring; wherein the spring is engaged with the attachment device via the weight when the attachment device is in the raised position.

In certain embodiments, the weight comprises a tapered upper end portion that engages the spring when the attachment device is in the raised position.

In certain embodiments, the unmanned aerial vehicle further comprises an attachment device sensor in communication with the control system and operable to detect when the attachment device is in the raised position; wherein the control system is configured to operate the motor to raise the attachment device, and to cause the motor to cease raising the attachment device based upon information generated by the attachment device sensor.

In certain embodiments, the unmanned aerial vehicle further comprises a load sensor in communication with the control system, the load sensor including an actuating arm engaged with the line; wherein the line is configured to depress the actuating arm when the parcel is loaded onto the attachment device to thereby alter an output of the load sensor.

In certain embodiments, the unmanned aerial vehicle further comprises a pulley engaged with the line such that the free portion extends horizontally from the spool to the pulley and extends vertically from the pulley to the attachment device.

In certain embodiments, the attachment device comprises a hook.

Certain embodiments of the present application relate to a winch assembly configured for mounting to an unmanned aerial vehicle (UAV), the winch assembly comprising: a mounting assembly configured to be secured to a chassis of the UAV; a spool rotatably mounted to the mounting assembly; a line including a wound portion wound about the spool and a free portion; an attachment device attached to the free portion of the line and configured to facilitate attachment of a parcel to the line, the attachment device having a raised position and a lowered position; a motor operable to rotate the spool in each of a raising direction and a lowering direction, wherein rotation of the spool in the raising direction raises the attachment device, and wherein rotation of the spool in the lowering direction lowers the attachment device; and an attachment device sensor operable to detect when the attachment device is in the raised position.

In certain embodiments, the winch assembly further comprises a load sensor including an actuating arm engaged with the line; wherein the line is configured to depress the actuating arm when the parcel is loaded onto the attachment device to thereby alter an output of the load sensor.

In certain embodiments, the mounting assembly comprises a receiving space; and wherein at least a portion of the attachment device is seated in the receiving space when the attachment device is in the raised position.

In certain embodiments, the winch assembly further comprises a spring; wherein the spring is engaged between the chassis and the attachment device when the attachment device is in the raised position.

In certain embodiments, the winch assembly further comprises a printed circuit board (PCB) mounted to the mounting assembly; wherein the attachment device sensor is electrically connected with the PCB.

In certain embodiments, the winch assembly further comprises at least one additional sensor electrically connected with the PCB.

In certain embodiments, the winch assembly further comprises a wire harness operable to connect the PCB to a control system of the UAV.

In certain embodiments, the winch assembly further comprises a controller operable to control operation of the motor based at least in part upon information generated by the attachment device sensor.

In certain embodiments, the mounting assembly comprises a funnel-shaped opening through which the line extends.

In certain embodiments, the funnel-shaped opening is positioned between the spool and a pulley wheel.

Certain embodiments of the present application relate to a winch assembly configured for mounting to an unmanned aerial vehicle (UAV), the winch assembly comprising: a mounting assembly configured to be secured to a chassis of the UAV, the mounting assembly comprising a first passage, a second passage, and a receiving space connected with the second passage; a spool rotatably mounted to the mounting assembly; a line including a wound portion wound about the spool and a free portion; and a pulley wheel rotatably mounted to the mounting assembly; wherein a first segment of the free portion of the line extends through the first passage from the spool to the pulley wheel; and wherein a second segment of the free portion of the line extends through the second passage from the pulley wheel to the receiving space.

In certain embodiments, the first passage is funnel-shaped.

In certain embodiments, the funnel-shaped first passage has a larger diameter nearer the spool and a smaller diameter nearer the pulley wheel.

In certain embodiments, the first segment is horizontally-oriented; and wherein the second segment is vertically-oriented.

In certain embodiments, the winch assembly further comprises a sensor including an actuating arm engaged with the line; wherein the line places the actuating arm in a depressed position when tension in the line exceeds a threshold tension; wherein the line permits the actuating arm to adopt a projected position when the tension in the line is below the threshold tension; and wherein an output of the sensor varies based upon a depressed/projected position of the actuating arm.

Certain embodiments of the present application relate to an unmanned aerial vehicle, comprising: a control system; at least one rotor operable to generate lift under control of the control system; a line including a free portion hanging from the unmanned aerial vehicle; a hook attached to the free portion of the line, wherein the hook is operable to engage a parcel to be delivered by the unmanned aerial vehicle; and a load sensor operable to detect a loaded/unloaded state of the line, wherein the loaded/unloaded state is a loaded state when the parcel is suspended from the line, and wherein the loaded/unloaded state is an unloaded state when the parcel is disengaged from the hook; wherein the control system is configured to cause lowering of the hook to a position in which the parcel is supported by a target surface, and to subsequently cause raising of the hook and determine the loaded/unloaded state of the line based upon information transmitted by the load sensor; and wherein the control system is further configured to cause lowering of the hook an additional time in response to determining that the line remains in the loaded state.

In certain embodiments, the control system is further configured to count a number of attempts to release the parcel from the hook, each attempt comprising a lowering of the hook.

In certain embodiments, the unmanned aerial vehicle further comprises a severing mechanism operable to sever the line in response to receiving a severing signal from the control system; wherein the control system is further configured to transmit the severing signal to the severing mechanism in response to the number of attempts meeting or exceeding a threshold number of attempts.

In certain embodiments, the unmanned aerial vehicle further comprises: a spool, wherein a wound portion of the line is wound about the spool; and a motor operable to rotate the spool in a line-raising direction in response to receiving a raise signal from the control system; wherein to cause raising of the hook comprises transmitting the raise signal.

In certain embodiments, the unmanned aerial vehicle further comprises a hook sensor; wherein the control system is further configured to cause raising of the hook to a raised position in response to determining that the line is in the unloaded state; and wherein to cause raising of the hook to the raised position comprises to transmit the raise signal, and to cease transmitting the raise signal in response to information generated by the hook sensor indicates that the hook has reached the raised position.

In certain embodiments, the unmanned aerial vehicle further comprises: a spool, wherein a wound portion of the line is wound about the spool; and a motor operable to rotate the spool in a line-lowering direction in response to receiving a lower signal from the control system; wherein to cause lowering of the hook comprises transmitting the lower signal.

In certain embodiments, the load sensor comprises a mechanical snap-action switch comprising an actuating arm, the actuating arm having a projected position and a depressed position.

In certain embodiments, the actuating arm is engaged with the line; wherein the line places the actuating arm in the depressed position when the parcel is supported by the line; and wherein the line permits the actuating arm to adopt the projected position when the parcel is not supported by the line.

In certain embodiments, the actuating arm is engaged with the line; wherein the line places the actuating arm in the depressed position when tension in the line exceeds a threshold tension; and wherein the line permits the actuating arm to adopt the projected position when the tension in the line is below the threshold tension.

Certain embodiments of the present application relate to a method of operating an unmanned aerial vehicle (UAV), the method comprising: lowering a hook attached to a free portion of a line suspended from the UAV, wherein lowering the hook causes a parcel engaged with the hook to rest on a target surface; with the parcel supported by the target surface, raising the hook and determining a loaded/unloaded state of the line; and in response to determining that the line remains loaded, lowering the hook an additional time.

In certain embodiments, the method further comprises: counting a number of attempts to release the parcel from the hook, each attempt comprising a corresponding lowering of the hook; and severing the line in response to the number of attempts satisfying a threshold number of attempts.

In certain embodiments, the method further comprises lowering the hook a further time in response to the number of attempts failing to satisfy the threshold number of attempts.

In certain embodiments, the method further comprises: in response to determining that the line does not remain loaded, moving the hook to a raised position relative to the UAV.

In certain embodiments, moving the hook to the raised position comprises rotating a spool of the UAV in a winding direction to thereby decrease a length of a free portion of the line.

Certain embodiments of the present application relate to a method for releasing a parcel from an unmanned aerial vehicle (UAV), wherein the parcel is engaged with a hook that is attached to a line suspended from the UAV, the method comprising: lowering the hook such that the parcel is at least partially supported by a target surface, thereby performing an attempt to release the parcel from the hook; and performing at least one iteration of an iterative procedure, the iterative procedure comprising: raising the hook; determining whether the line remains loaded; in response to a determination that the line remains loaded, lowering the hook an additional time, thereby performing an additional attempt to release the parcel from the hook; and in response to the number of attempts failing to satisfy a threshold number of attempts, performing an additional iteration of the iterative procedure.

In certain embodiments, the iterative procedure further comprises: in response to the number of attempts satisfying the threshold number of attempts, severing the line.

In certain embodiments, the iterative procedure further comprises: in response to a determination that the line does not remain loaded, raising the hook to a raised position relative to the UAV.

In certain embodiments, raising the hook to the raised position comprises rotating a spool of the UAV in a winding direction to thereby wind the line further onto the spool.

In certain embodiments, raising the hook to the raised position further comprises ceasing rotation of the spool in response to a sensor of the UAV transmitting information indicating that the hook has reached the raised position.

In certain embodiments, lowering the hook comprises rotating a spool of the UAV in an unwinding direction to thereby increase a length of a free portion of the line.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An unmanned aerial vehicle, comprising:
a chassis:
a winch assembly comprising:
  a mounting assembly secured to the chassis;
  a spool rotatably mounted to the mounting assembly:
  a line including a wound portion wound about the spool and a free portion;
  an attachment device attached to the free portion of the line and configured to facilitate attachment of a parcel to the line, the attachment device having a raised position and a lowered position;
  a motor operable to rotate the spool in each of a raising direction and a lowering direction, wherein rotation of the spool in the raising direction raises the attachment device, and wherein rotation of the spool in the lowering direction lowers the attachment device; and
  an attachment device sensor operable to be actuated by the attachment device when the attachment device is in the raised position and configured to transmit a signal when actuated by the attachment device;
a control system mounted to the chassis and in communication with the attachment device sensor;
at least one rotor operable to generate lift under control of the control system; and
a spring positioned between the chassis and the attachment device such that the spring is engaged between the chassis and the attachment device when the attachment device is in the raised position;
wherein the spring is a coil spring; and
wherein the line passes through the coil spring.

2. The unmanned aerial vehicle of claim 1, wherein the spring is secured to the chassis.

3. The unmanned aerial vehicle of claim 1, wherein the chassis comprises a housing defining a receiving space; and
  wherein at least a portion of the attachment device is received in the receiving space when the attachment device is in the raised position.

4. An unmanned aerial vehicle, comprising:
a chassis;
a winch assembly comprising:
    a mounting assembly secured to the chassis;
    a spool rotatably mounted to the mounting assembly;
    a line including a wound portion wound about the spool and a free portion;
    an attachment device attached to the free portion of the line and configured to facilitate attachment of a parcel to the line, the attachment device having a raised position and a lowered position;
    a motor operable to rotate the spool in each of a raising direction and a lowering direction, wherein rotation of the spool in the raising direction raises the attachment device, and wherein rotation of the spool in the lowering direction lowers the attachment device; and
    an attachment device sensor operable to be actuated by the attachment device when the attachment device is in the raised position and configured to transmit a signal when actuated by the attachment device;
a control system mounted to the chassis and in communication with the attachment device sensor;
at least one rotor operable to generate lift under control of the control system;
a spring positioned between the chassis and the attachment device such that the spring is engaged between the chassis and the attachment device when the attachment device is in the raised position; and
a weight positioned on the line between the attachment device and the spring;
wherein the spring is engaged with the attachment device via the weight when the attachment device is in the raised position.

5. The unmanned aerial vehicle of claim 4, wherein the weight comprises a tapered upper end portion that engages the spring when the attachment device is in the raised position.

6. The unmanned aerial vehicle of claim 1, wherein the control system is configured to operate the motor to raise the attachment device, and to cause the motor to cease raising the attachment device based upon information generated by the attachment device sensor.

7. The unmanned aerial vehicle of claim 1, further comprising a load sensor in communication with the control system, the load sensor including an actuating arm engaged with the line;

wherein the line is configured to depress the actuating arm when the parcel is loaded onto the attachment device to thereby alter an output of the load sensor.

8. The unmanned aerial vehicle of claim 1, further comprising a pulley engaged with the line such that the free portion extends horizontally from the spool to the pulley and extends vertically from the pulley to the attachment device.

9. The unmanned aerial vehicle of claim 1, wherein the attachment device comprises a hook.

10. The unmanned aerial vehicle of claim 1, wherein the mounting assembly comprises a receiving space; and
    wherein at least a portion of the attachment device is seated in the receiving space when the attachment device is in the raised position.

11. The unmanned aerial vehicle of claim 1, further comprising a spring;
    wherein the spring is engaged between the chassis and the attachment device when the attachment device is in the raised position.

12. The unmanned aerial vehicle of claim 1, further comprising a printed circuit board (PCB) mounted to the mounting assembly;
    wherein the attachment device sensor is electrically connected with the PCB.

13. The unmanned aerial vehicle of claim 12, further comprising at least one additional sensor electrically connected with the PCB.

14. The unmanned aerial vehicle of claim 12, further comprising a wire harness through which the PCB is connected to the control system.

15. The unmanned aerial vehicle of claim 1, further comprising a controller operable to control operation of the motor based at least in part upon information generated by the attachment device sensor, wherein the controller is configured to cease rotation of the spool in the raising direction in response to receiving the signal.

16. The unmanned aerial vehicle of claim 1, wherein the mounting assembly comprises a funnel-shaped opening through which the line extends.

17. The unmanned aerial vehicle of claim 16, wherein the funnel-shaped opening is positioned between the spool and a pulley wheel.

* * * * *